(12) United States Patent
Damle

(10) Patent No.: US 7,237,035 B1
(45) Date of Patent: *Jun. 26, 2007

(54) FRAME STRUCTURE AND METHOD FOR WAVELENGTH CONCATENATED CHANNEL FRAMING

(75) Inventor: Rajendra R. Damle, Plano, TX (US)

(73) Assignee: Ceterus Networks, Inc., Richardson, TX (US)

(*) Notice: Subject to any disclaimer, the term of this patent is extended or adjusted under 35 U.S.C. 154(b) by 868 days.

This patent is subject to a terminal disclaimer.

(21) Appl. No.: 10/086,273

(22) Filed: Feb. 20, 2002

Related U.S. Application Data

(63) Continuation-in-part of application No. 10/074,264, filed on Feb. 12, 2002.

(60) Provisional application No. 60/268,237, filed on Feb. 12, 2001, provisional application No. 60/268,180, filed on Feb. 12, 2001, provisional application No. 60/287,973, filed on Apr. 30, 2001, provisional application No. 60/295,645, filed on Jun. 4, 2001.

(51) Int. Cl.
*G06F 13/00* (2006.01)

(52) U.S. Cl. .................................................... 709/236
(58) Field of Classification Search ................ 709/236
See application file for complete search history.

(56) References Cited

U.S. PATENT DOCUMENTS

| 4,383,316 | A | | 5/1983 | Seidel ..................... 370/536 |
| 4,577,312 | A | | 3/1986 | Nash |
| 4,703,475 | A | | 10/1987 | Dretzka et al. |
| 4,775,987 | A | | 10/1988 | Miller |
| 4,885,738 | A | | 12/1989 | Bowers et al. |
| 4,991,172 | A | | 2/1991 | Cidon et al. |
| 5,051,982 | A | * | 9/1991 | Brown et al. ............... 370/381 |
| 5,065,396 | A | | 11/1991 | Castellano et al. |
| 5,251,210 | A | | 10/1993 | Mann et al. |
| 5,293,378 | A | | 3/1994 | Shimizu |
| 5,524,111 | A | * | 6/1996 | Le Pennec et al. ......... 370/465 |
| 5,570,356 | A | | 10/1996 | Finney et al. |
| 6,094,575 | A | * | 7/2000 | Anderson et al. ........ 455/422.1 |
| 6,697,381 | B1 | * | 2/2004 | Talbot et al. ................ 370/470 |
| 6,826,179 | B1 | * | 11/2004 | Talbot et al. ................ 370/389 |

* cited by examiner

*Primary Examiner*—Kenneth R. Coulter
(74) *Attorney, Agent, or Firm*—Campbell Stephenson LLP

(57) ABSTRACT

A method and apparatus capable of supporting a wavelength concatenated framing protocol is disclosed.

13 Claims, 23 Drawing Sheets

FRAME STRUCTURE AND METHOD FOR WAVELENGTH CONCATENATED CHANNEL FRAMING

CROSS-REFERENCES TO RELATED APPLICATIONS

This application is a continuation-in-part of patent application Ser. No. 10/074,264, entitled "TRANSPORT OF HIGH-BANDWIDTH DATASTREAMS OVER A NETWORK," filed on Feb. 12, 2002, and having R. Damle, Y. Lee, W. Szeto, R. Butler and H. M. Zadikian as inventors, which, in turn, claims priority from the following provisional patent applications under 35 U.S.C. §119(e):
1. Provisional Patent Application Ser. No. 60/268,237, entitled "EVOLUTION OF CARRIER BACKBONE DATA NETWORK NEW REQUIREMENTS", filed Feb. 12, 2001, and naming R. R. Damle as inventor;
2. Provisional Patent Application Ser. No. 60/268,180, entitled "END-TO-END NETWORK ARCHITECTURE FOR THE NEXT GENERATION IP NETWORK", filed Feb. 12, 2001, and naming R. K. Butler as inventor;
3. Provisional Patent Application Ser. No. 60/287,973, entitled "METHOD AND APPARATUS FOR LONG-HAUL OPTICAL NETWORKING", filed Apr. 30, 2001, and naming R. K. Butler as inventor; and
4. Provisional Patent Application Ser. No. 60/295,645, entitled "TRANSPORT OF HIGH-BANDWIDTH DATASTREAMS OVER A NETWORK", filed Jun. 4, 2001, and naming R. Damle, Y. Lee, W. Szeto, R. Butler and H. M. Zadikian as inventors.

These applications are hereby incorporated by reference herein, in their entirety and for all purposes.

The present application also claims priority from:
1. Provisional Patent Application Ser. No. 60/270,444, entitled "METHOD AND APPARATUS FOR WAVELENGTH CONCATENATED CHANNEL FRAMING", filed Feb. 20, 2001, and naming R. R. Damle as inventor.

Applicants hereby claim the benefit under 35 U.S.C. §119(e) of the foregoing-referenced provisional patent application. The foregoing-referenced provisional patent application is hereby incorporated by reference herein, in its entirety and for all purposes.

BACKGROUND OF THE INVENTION

1. Field of the Invention

This invention relates to the field of information networks, and more particularly relates to a method and system for conveying information over a network.

2. Description of the Related Art

Today's networks carry vast amounts of information. High-bandwidth applications supported by these networks include streaming video, streaming audio, and large aggregations of voice traffic, among other such applications. In the future, these demands are certain to increase. To meet such demands, an increasingly popular alternative is the use of lightwave communications carried over fiber-optic cables. The use of lightwave communications provides several benefits, including high bandwidth, ease of installation, and capacity for future growth.

In this new age of data-centric communication networks, the ability to support terabit rate routing in the network core is becoming a more common requirement. In an effort to make terabit routing a reality, such technology needs to be economical, as well as being efficient in design and integration. Ease of use and serviceability are also important. An efficient design involves framing protocols, integrated hardware and software, and network design as a whole. If addressed, such a solution results in a highly economical and deployable communications system.

Over the next five years, the growth projected by major service providers (e.g., UUNet, AT&T and Sprint) in their data (IP) networks is exponential. The architecture of such high-bandwidth backbone networks have, among others, at least three important properties:
1. Such networks tend to be made up of a relatively small number of switching/routing nodes interconnected by very high bandwidth links. The aggregate capacity of each of such links is projected to go beyond 40 Gbps in the near future, with even higher speeds to follow.
2. As the amount of traffic increases, the bandwidth required between these nodes will increase, but the number of nodes is expected to remain relatively constant.
3. These switching nodes tend to be widely dispersed, geographically, with large inter-node distances (e.g., typically over 1000 km).

The synchronous optical network (SONET) protocol is among those protocols employed in today's optical infrastructures. SONET is a physical transmission protocol capable of transmission speeds in the multi-gigabit range, and is defined by a set of electrical as well as optical standards. SONET's ability to use currently-installed fiber-optic cabling, coupled with the fact that SONET significantly reduces complexity and equipment functionality requirements, has given local and interexchange carriers incentive to employ SONET. Also attractive is the immediate savings in operational cost that this reduction in complexity provides. SONET thus allows the realization of high-bandwidth services in a more economical manner than previously existed.

Today, the bandwidth requirements of communications between the core packet switches using SONET have increased from 2.5 Gbps (OC-48 in the SONET standard) to 10 Gbps (OC-192 in the SONET standard) in some cases. Routers with single OC-48- or OC-192-capable port cards and a transport system that can carry such a data rate over a single wavelength have supported these increases.

While the port speeds of routers can (and likely will) be increased beyond 10 Gbps, the transport systems presently in place are unable to transport such high-speed datastreams (e.g., a 40 Gbps (or greater) datastream) using currently-installed fiber-optic cabling, at least without expensive (and frequent) regeneration. This inability to economically transport such higher-speed datastreams (i.e., beyond 10 Gbps) over long distances using currently-installed fiber-optic cabling is an obstacle to deployment of high-speed transport at the network core.

Moreover, the efficiency (the amount of data versus the overall size of a frame) provided by SONET is somewhat less than desirable. A SONET frame provides an efficiency of about 96.2%. This means that 3.8% of the available bandwidth is consumed by overhead (or is unused). In the case of an OC-192 signal, for example, this equates to wasted bandwidth of about 378 Mbps. Given the costs associated with providing bandwidth at such data rates, this overhead represents appreciable lost revenues. While 100% efficiency is unlikely, given that some overhead is typically required, it is still desirable to improve the efficiency provided by available communication channels.

One possible alternative to increasing the bandwidth of the connections between core routers is to grow the existing port count and use multiple ports between routers. Although this seems logical from the perspective of the connection, this alternative is not very scalable or economical because the IP forwarding table per port increases linearly and the total memory required for the forwarding table increases as $N^2$ (where N=number of ports). The large port count also involves larger space and power requirements that add to the cost of this solution.

The definition of a framing protocol and mechanism that support a solution to this predicament are thus required. Such a protocol and mechanism should be efficient and easily implemented in various hardware architectures. Moreover, such a protocol and mechanism should exhibit high functional accuracy that is verifiable via simulations.

SUMMARY OF THE INVENTION

In one embodiment of the present invention, a method and apparatus capable of supporting a wavelength concatenated framing protocol is disclosed.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention provides a frame structure that takes advantage of the higher speed and lower power silicon technologies to increase the router port throughput beyond 10 Gbps, while keeping the memory requirements to a minimum. This solution is also more economical from the transmission system perspective since the data rate per wavelength is kept at 10 Gbps. In the future, as fiber-optical and transmission technologies evolve to carry higher data rates per wavelength over longer distances, such technologies can be easily incorporated into schemes according to the present invention.

The economy of this solution rests on maximizing the throughput of each of the high-speed ports by utilizing multiple 10 Gbps point-to-point transmission lines more efficiently than the standard SONET framing protocol. A new framing protocol that enhances the throughput over the 10 Gbps point-to-point links by minimizing the overhead requirements for the application is provided by embodiments of the present invention. In addition to overhead efficiency, the framing protocol provides:

1. The ability to verify accuracy of super-channel connectivity;
2. Support for a super-channel-level 1&1 protection and restoration mechanism architected into a switch or router;
3. The ability to monitor various failure conditions of each transmission link independently;
4. The ability to communicate to the far-end switch to start or stop transmitting on a sub-channel based upon one or more error conditions;
5. The ability to manually provision a sub-channel in and out of service;
6. The ability to allow asymmetric sub-channel connectivity in the forward (W-to-E) and reverse (E-to-W) direction;
7. The ability to allow configurable sub-channel burn-in prior to the sub-channel carrying traffic; and
8. The ability to allow a user access to a user communication channel from the transmitter to the receiver; and
9. 99% (or better) raw payload throughput.

An Example Network Employing Features of the Present Invention

Figure 1:
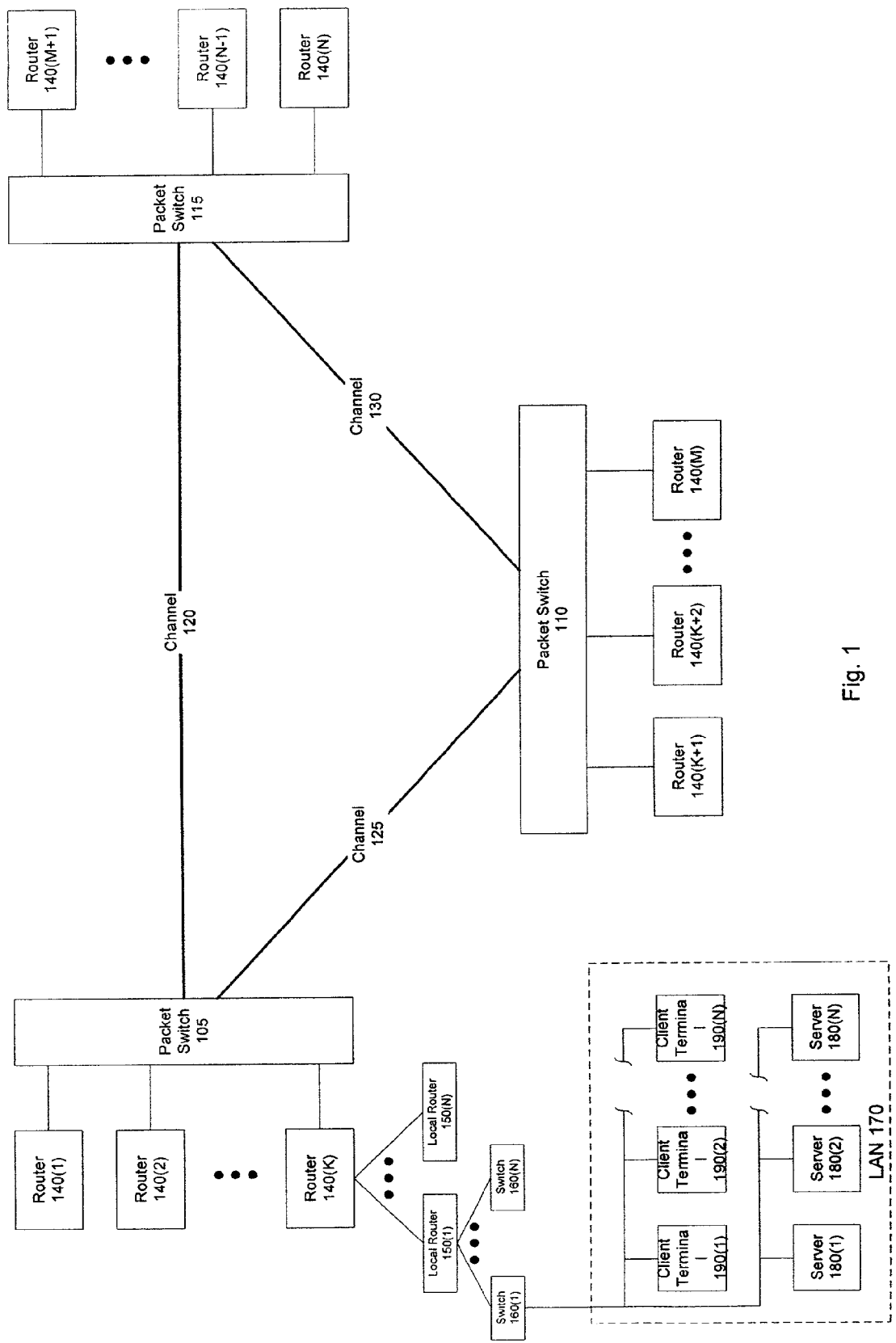
FIG. 1 is a block diagram illustrating a network that supports and employs the use of a framing technology according to embodiments of the present invention.

FIG. 1 is a block diagram illustrating a network 100 that supports and employs the use of a framing technology such as that described in embodiments of the present invention. Network 100 includes packet switches 105, 110 and 115, which are coupled to one another via channels 120, 125 and 130. Each of packet switches 105, 110 and 115 are also coupled to one or more routers (depicted in FIG. 1 as routers 140(1)–(N)). As depicted in FIG. 1, packet switch 105 is coupled to routers 140(1)–(K); packet switch 110 is coupled to routers 140(K+1)–(M); and packet switch 115 is coupled to routers 140(M+1)–(N). Packet switches 105, 110 and 115 provide access to the core of network 100 (represented by channels 120, 125 and 130) to each of routers 140(1)–(N), allowing traffic from each of routers 140(1)–(N) to be communicated over the core of network 100.

Connections to each of routers 140(1)–(N) are exemplified in FIG. 1 by the connections to router 140(K) depicted therein. Local routers 150(1)–(N) are depicted as being coupled to router 140(K), as might be the case in the architecture of a metropolitan area network (MAN) or some other type of regional network. Again, as an example, switches 160(1)–(N) are depicted in FIG. 1 as being coupled to local router 150(1)–(N). Switches 160(1)–(N) might be, for example, located in an entity's building, and serve the local area networks within that building, providing access to the metropolitan area network and to the core of network 100, via the network elements previously discussed. An example of such a local area network is depicted in FIG. 1 as a local area network (LAN)170, coupled to switch 160(1). LAN 170 includes, for example, servers 180(1)–(N) and client terminals 190(1)–(N). LAN 170 not only couples client terminals 190(1)–(N) to servers 180(1)–(N), but also to switch 160(1), thus providing access to the local routers, routers, packet switches and channels of network 100.

Figure 2:
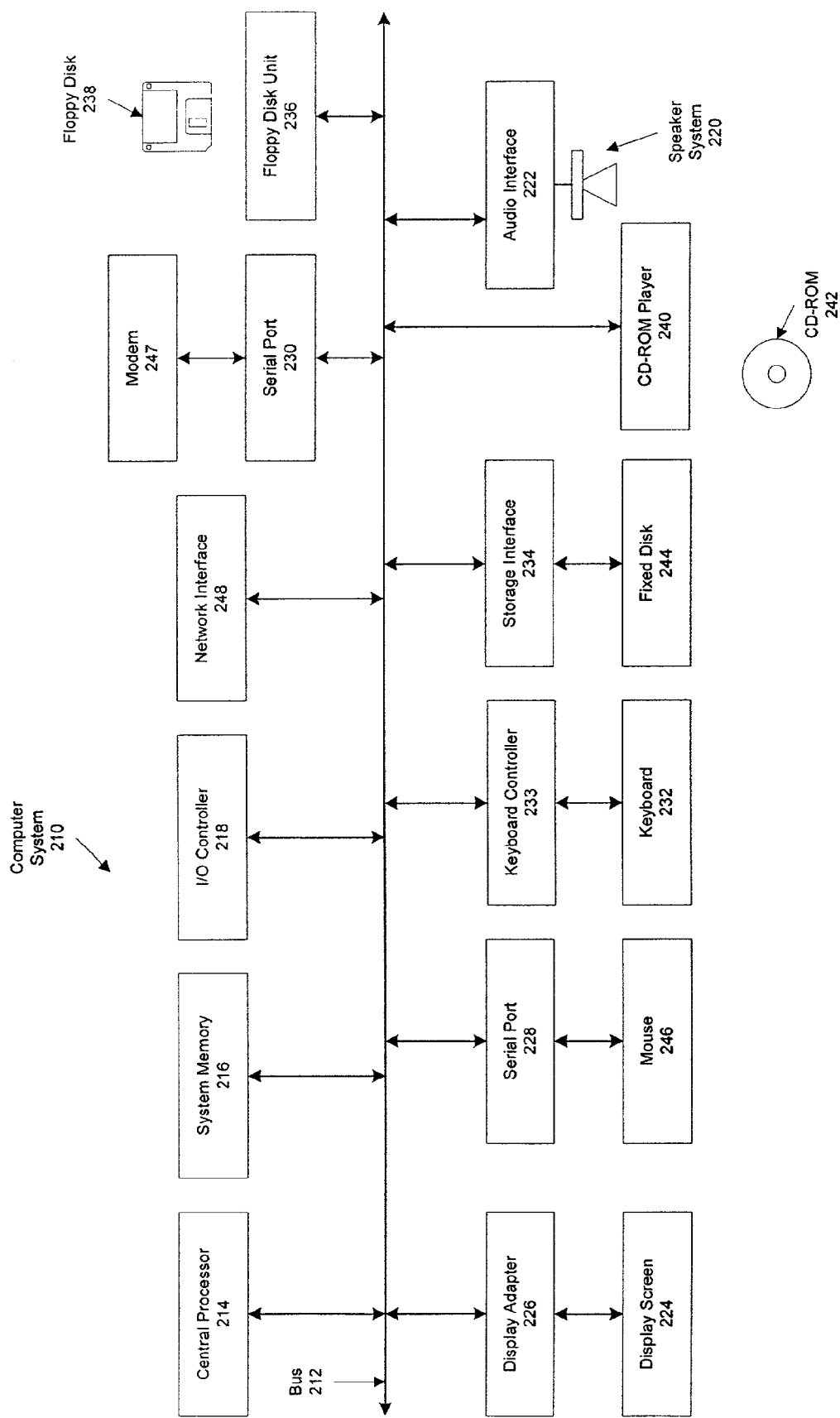
FIG. 2 depicts a block diagram of a computer system suitable for implementing the present invention.

FIG. 2 depicts a block diagram of a computer system 210 suitable for implementing the present invention, and exemplary of a computer capable of being coupled to LAN 170, as well as performing processing and control functions throughout network 100. Computer system 210 includes a bus 212 which interconnects major subsystems of computer system 210 such as a central processor 214, a system memory 216 (typically RAM, but which may also include ROM, flash RAM, or the like), an input/output controller 218, an external audio device such as a speaker system 220 via an audio output interface 222, an external device such as a display screen 224 via display adapter 226, serial ports 228 and 230, a keyboard 232 (interfaced with a keyboard controller 233), a storage interface 234, a floppy disk drive 236 operative to receive a floppy disk 238, and a CD-ROM drive 240 operative to receive a CD-ROM 242. Also included are a mouse 246 (or other point-and-click device, coupled to bus 212 via serial port 228), a modem 247 (coupled to bus 212 via serial port 230) and a network interface 248 (coupled directly to bus 212).

Bus 212 allows data communication between central processor 214 and system memory 216, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., CD-ROM drive 240), floppy disk unit 236 or other storage medium. Additionally, applications may be in the form of electronic signals modulated in accordance with the application and data communication technology when accessed via network modem 247 or interface 248.

Storage interface 234, as with the other storage interfaces of computer system 210, may connect to a standard computer readable medium for storage and/or retrieval of information, such as a fixed disk drive 244. Fixed disk drive 244 may be a part of computer system 210 or may be separate and accessed through other interface systems. Many other devices can be connected such as a mouse 246 connected to bus 212 via serial port 228, a modem 247 connected to bus 212 via serial port 230 and a network interface 248 connected directly to bus 212. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 2 to be present to practice the present invention. The devices and subsystems may be interconnected in different ways from that shown in FIG. 2. The operation of a computer system such as that shown in FIG. 2 is readily known in the art and is not discussed in detail in this application. Code to implement the present invention may be operably disposed or stored in computer-readable storage media such as one or more of system memory 216, fixed disk 244, CD-ROM 242, or floppy disk 238. Additionally, computer system 210 may be any kind of computing device, and so is intended to include personal data assistants (PDAs), network appliances, X-window terminals or other such computing devices.

An Example Routing Unit

Figure 3:
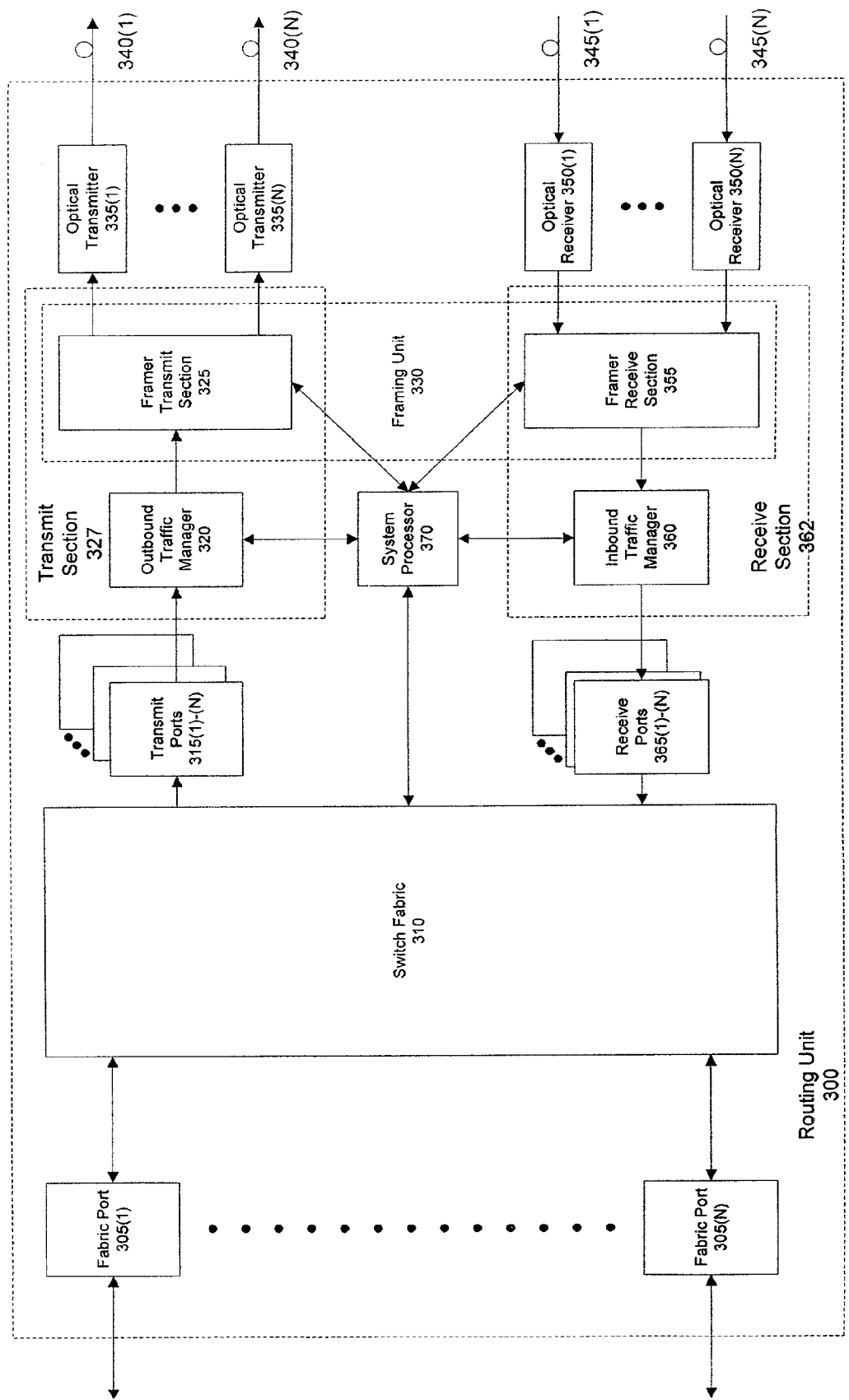
FIG. 3 is a block diagram illustrating a routing unit according to embodiments of the present invention.

FIG. 3 is a block diagram illustrating a routing unit 300. A routing unit such as routing unit 300 is included in each of packet switches 105, 110 and 115, and perform the functions that support a framing mechanism according to embodiments of the present invention. Initially, when routing unit 300 receives a datastream, routing unit 300 receives the given datastream at one of fabric ports 305(1)–(N). The datastream is then supplied to a switch fabric 310, which switches the datastream to one of transmit ports 315(1)–(N). Transmit ports 315(1)–(N) output their respective datastreams to an outbound traffic manager 320, which contains a number of input queues (not shown). From the input queues of outbound traffic manager 320, the datastreams are supplied to a framer transmit section 325 of a framing unit 330. Taken together, outbound traffic manager 320 and framer transmit section 325 form, at least in part, a transmit section 327. Framer transmit section 325 assembles pieces of the datastreams (referred to herein as data units) and places the framed data units in output queues within framer transmit section 325 (now shown). These framed data units (or, more simply, frames) are then provided to optical transmitters 335(1)–(N) for transmission over, for example, optical fibers (depicted in FIG. 3 as optical fibers 340(1)–(N)). It will be noted that optical fibers 340(1)–(N) can correspond (e.g., in certain embodiments) to one or more of channels 120, 125 or 130.

In a similar fashion, datastreams are received from optical fibers 345(1)–(N) by optical receivers 350(1)–(N). Optical receivers 350(1)–(N) convert the optical datastreams into electrical datastreams and provide those electrical datastreams to a framer receive section 355 of framing unit 330. Framer receive section 355 reverses the frame generation process performed by the framer transmit section on the transmit side of the network, generating the original datastreams and providing them to an inbound traffic manager 360. Taken together, framer receive section 355 and inbound traffic manager 360 form, at least in part, a receive section 362. Inbound traffic manager 360 includes a number of input queues into which the incoming datastreams are stored. These incoming datastreams, after being queued, are then provided to corresponding ones of receive ports 365(1)–(N). Receive ports 365(1)–(N), in turn, provide these datastreams to switch fabric 310, which switches the incoming datastreams to the proper one of fabric ports 305(1)–(N). Controlling these operations, via control of various of the elements of routing unit 300, is a system processor 370. In this manner, datastreams are both transmitted to and received from the proper packet switches of network 100.

In the example depicted in FIG. 3, the switch fabric port speed (i.e., the speed supported by transmit ports 315(1)–(N) and receive ports 365(1)–(N)) is preferably a multiple of the outgoing sub-channel speeds (data rates) from transmit section 327 (via framer transmit section 325, and subsequently optical transmitters 335(1)–(N)) or the line card (i.e., optical receivers 350(1)–(N) and framer receive section 355), respectively. Framer transmit section 325 receives data from outbound traffic manager 320 and distributes the data across several of the outgoing sub-channels and encapsulates each of the datastreams in a frame as described in regard to FIG. 4. A mirror image of this process is performed by receive section 362 in re assembling the payloads into their constituent datastreams. In addition to the re-assembly process, receive section 362 communicates with transmit section 327, as well as the line card processor (not shown) to provide protection and restoration of the sub-channels and super-channel.

It will be noted that the variable identifier "N" is used in several instances in FIG. 3 to more simply designate the final element (e.g., transmit ports 315(1)–(N) and receive ports 365(1)–(N)) of a series of related or similar elements (e.g., transmit ports and receive ports). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of routing unit 300). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An Example Frame Structure

Figure 4:
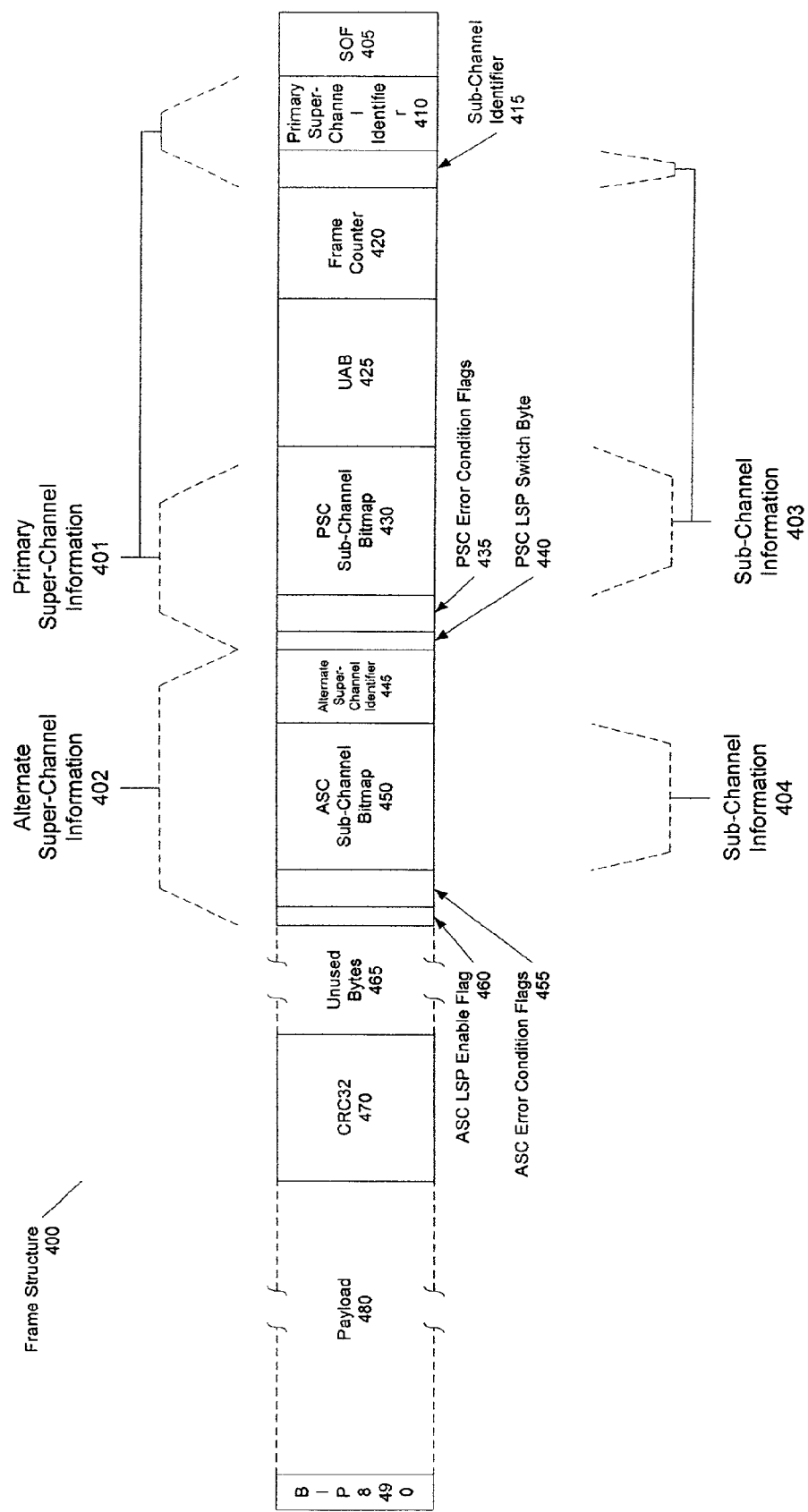
FIG. 4 is a block diagram of an example layout of the frame structure according to embodiments of the present invention.

FIG. 4 is a block diagram of an example layout of the frame structure according to embodiments of the present invention. Frame structure 400 can include, for example, information regarding both a primary super-channel and an alternate super-channel (depicted in FIG. 4 as primary super-channel information 401 and alternate super-channel information 402), as well as information regarding sub-channels thereof (depicted in FIG. 4 as sub-channel information 403 and sub-channel information 404). As depicted in FIG. 4, frame structure 400 starts with the information depicted on the right and moves through to the end of the frame with the information depicted on the left.

In one embodiment of the present invention, frame structure 400 is 155,520 bytes in length, and is transmitted in 125 μsec, thereby achieving a data rate of $9.95328 \times 10^9$ bps. This structure and transmission rate supports frame transmission that is similar to the familiar SONET OC 192 data rate. It should be noted here that there is no inherent limitation on the size or the number of payload data units (PDUs) or overhead (OH) bytes and therefore suitable changes can be made for alternative applications.

Frame structure 400 begins with start-of-frame (SOF) information 405. SOF information 405 indicates the beginning of the frame. The function of SOF information 405 is to allow receiver section 362 (or, more specifically, framer receive section 355) to synchronize on the incoming sub-channel frame. In one embodiment, the first byte transmitted is 0xAA (10101010), while the second byte transmitted is 0xA5 (10100101). Also, the SOF sequence should not be scrambled before transmission.

Next is the first portion of primary super-channel information 401, which includes primary super-channel identifier 410 and sub-channel identifier 415. The function of primary super-channel identifier 410 is to allow the receive framer (e.g., framer receive section 355) to verify that the super-channel connection is received from the intended node. This feature is important in the backbone network (e.g., network 100), where the separation between the transmitting node and the receiving node can be 1000 km or more, with several transport network elements between them. The value of super-channel identifier 410 can be, for example, any value between 0 and 65536. In one embodiment, a super-channel identifier value of 0x0000 is reserved for an Alarm Indication Signal (AIS) frame. The AIS frame has an SOF, a super-channel identifier, CRC32 information and BIP8 information as the valid overhead with empty payload data units (PDUs; described subsequently, in connection with FIG. 16D). To maintain connection accuracy across network 100, no two super-channels should have the same super-channel identifier. Typically, super-channel identifier 410 is initialized at startup by the system control software executed by system processor 370.

In certain embodiments, sub-channel identifier 415 is a single byte and contains seven bits of identifying information and an "Active" bit (not shown). The function of sub-channel identifier 415 is to allow framer receive section 355 to identify individual sub-channels within a super-channel. Sub-channel identifier 415 also indicates the round-robin sequence in which the payload units are distributed across the available sub-channels (in embodiments employing a round-robin technique), allowing framer receive section 355 to accurately extract the payload. The Active bit is set by framer transmit section 325 in response to the receipt by framer transmit section 325 of a bitmap from the far-end framer receive framer section (analogous to receive framer section 355) indicating that the sub-channel is tested and can be used. When the Active bit of sub-channel identifier 415 indicates that a sub-channel is in use, framer transmit section 325 sends live data via the PDUs and empty PDUs are sent when there is no data to be sent. Framer transmit section 325 examines the received bitmap every PDU time. If the Active bit changes from 1 to 0, framer transmit section 325 sends an empty PDU immediately following the change. But if the Active bit changes from 0 to 1, framer transmit section 325 begins sending user data only in the following frame after the Active bit is set to 1.

The values used in sub-channel identifier 415 preferably start from 0 and run, in ascending order, up to the maximum number of sub-channels supported by routing unit 300. For example, a maximum of 128 sub-channels can be supported by a 7 bit sub-channel identifier, assuming the preceding arrangement. It will be noted that sub-channel identifiers can be hard-coded in routing unit 300, or can be downloadable (e.g., from the memory (not shown) associated with system processor 370). It will be noted, however, that, although a 7 bit sub-channel identifier can support up to 128 sub-channels, only sub-channels 0 through 63 are valid in an implementation that uses a 64 bit sub-channel bitmap for sub-channel protection. The sub-channel bitmap definition is discuss subsequently.

Frame structure 400 also includes a frame counter 420. The function of frame counter 420 is to keep a count of the number of frames transmitted since power-on or the last counter rollover. The frame count is also used to synchronize all the active sub-channels within a super-channel before the payload is extracted. In one embodiment, frame counter 420 is 4 bytes in length and so can count up to 4 G (4,294,967,296) consecutive frames before roll over. It will be noted that a rollover will occur at approximately 149.131 hours at 10 Gbps frame transmission rate. Because the sub-channel frames are generated and transmitted by the transmit framer (framer transmit section 325) at the same clock, the sub-channel frames leaving the transmit framer (framer transmit section 325) at any time should have the same frame count.

Following frame counter 420 are user-accessible bytes (UAB) 425. The function of UAB 425 is to allow the system's user to send and receive information to and from the remote network element. UAB 425 can be directly written to and read from directly accessible registers located in, for example, transmit framer section 325 and receive framer section 362, respectively. A user can choose to send different information on each sub-channel or the same information on all the sub-channels, depending on the user's needs with regard to protection.

The remaining portions of primary super-channel information 401 are shown following. This information includes a primary super-channel (PSC) sub-channel bitmap 430, a set of PSC error condition flags 435 and a PSC label-switched path (LSP) switch byte 440C. An LSP is a routing technique that routes information based on labels. Next is the information contained in alternate super-channel information 402. This information includes an alternate super-channel (ASC) identifier 445, an ASC sub-channel bitmap 450, a set of ASC error condition flags 455 and an ASC LSP enable flag 460.

PSC sub-channel bitmap 430 and ASC sub-channel bitmap 450 are typically configured to implement sub-channel-level fast protection and restoration at layer one by indicating failure to the far-end transmitter. This also allows, for example, the system user to manually take a sub-channel out-of-service, if need be. In one embodiment, the least-significant bit of the first byte transmitted corresponds to a received sub-channel identifier value of 0. The next significant bit corresponds to a received sub-channel identifier value of 1. The least-significant bit of the second byte transmitted corresponds to a received sub-channel identifier value of 8. An error on a received sub-channel is indicated to the far-end transmitter by sending out a bitmap with the bit corresponding to the sub-channel identifier reset to 0. The bitmap carried by the various sub-channels should be identical. This is done to ensure that the bitmap reaches the far-end transmitter, even if only a single working sub-channel is alive in the reverse direction. In the normal case (i.e., with multiple sub-channels alive), framer receive section 355 selects the most conservative sub-channel bitmap. At power-on, the sub-channel bitmap transmitted by the transmitting node is reset to all zeros. The bitmap in the transmitting node is then modified by the receiving node as the receiving node receives good frames on each sub-channel. Each bit in the bitmap received from the receiving node can be individually overridden by the user of the system via dedicated registers. This feature allows the system user to manually take individual sub-channels in and out of service (e.g., for repairs). As currently defined, a 64 bit bitmap supports only 0–63 sub-channels, although sub-channel identifier 415 can support 128 sub-channels. The unused bytes in the frame overhead can also be used to support more than 64 sub-channels. The sub-channel identifier values that are not supported by the bitmap are considered invalid.

The function of the error condition flags (i.e., PSC error condition flags 435 and ASC error condition flags 455) is to inform the far-end network element of error conditions seen by the near-end receiver. The first two bytes transmitted following the sub-channel bitmap (i.e., PSC sub-channel bitmap 430 and ASC sub-channel bitmap 450) are the error condition flags, followed by the LSP switch byte. The bit definitions of these fields are given in Tables 1, 2 and 3.

threshold on one channel and LOS on another), the error condition bits (as depict in Tables 1 and 2) are not configured to resolve which of the channels is experiencing which error condition. It will be apparent to one of skill in the art that such information could be included in the overhead bytes (e.g., PSC information 401 and ASC information 402), but this would reduce the efficiency of the frame structure. It will also be noted that, preferably, error condition flags are ordered from the MSBit, which contains an indication of the most severe error, down to the LSBit, which contains an indication of the least severe error.

The function of the LSP switch byte is to inform the far-end line card to switch the guaranteed bandwidth LSPs to an alternate channel, when the capacity of the given super-channel drops below the total guaranteed bandwidth traffic through that super-channel. Guaranteed bandwidth traffic is traffic that is designated as having a priority (e.g. quality-of-service level) that necessitates guaranteeing availability of the necessary bandwidth (i.e., datastream(s)). In the embodiment depicted herein, the most-significant bit (MSBit) of the LSP switch byte (bit 2_7) is owned by the primary super-channel (both directions) and the next-most-significant bit (bit 2_6) is owned by the alternate super-channel (both directions). These bits are externally set in the framer transmit section by the system processor. In response to the bitmap generated by the framer receive section, the system control software executed by the system processor calculates the amount of bandwidth available in that super-channel direction and compares the available bandwidth with the guaranteed bandwidth that is carried through that super-channel. If the total available bandwidth is either close to or smaller than the guaranteed bandwidth traffic, then the bit in the LSP switch byte corresponding to that super-

TABLE 1

The error condition flags byte #1.

| MSBit Bit 0_7 | Bit 0_6 | Bit 0_5 | Bit 0_4 | Bit 0_3 | Bit 0_2 | Bit 0_1 | LSBit Bit 0_0 |
|---|---|---|---|---|---|---|---|
| CH_ID Error | Channel excluded due to excess skew | RDI in response to AIS frame received | CRC Error Degradation beyond threshold | Loss-of-signal (LOS) | Loss-of-signal (LOF) | BER Degradation beyond threshold | Forced-Manual Switch |

TABLE 2

The error condition flags byte #2.

| MSBit Bit 1_7 | Bit 1_6 | Bit 1_5 | Bit 1_4 | Bit 1_3 | Bit 1_2 | Bit 1_1 | LSBit Bit 1_0 |
|---|---|---|---|---|---|---|---|
| Unused | Unused | Unused | Unused | Unused | Unused | Unused | Sub_ch_ID Error |

TABLE 3

The LSP switch byte.

| MSBit Bit 2_7 | Bit 2_6 | Bit 2_5 | Bit 2_4 | Bit 2_3 | Bit 2_2 | Bit 2_1 | LSBit Bit 2_0 |
|---|---|---|---|---|---|---|---|
| 1/0 | 1/0 | Unused | Unused | Unused | Unused | Unused | Unused |

Given the preceding definitions, several points can be made. If more than one sub-channel has different (and distinct) error conditions (e.g., a BER degradation beyond channel is reset to zero, and is sent out to the far-end line card in the LSP switch byte. Upon receiving the bit in the LSP switch byte belonging to the given super-channel reset to 0, the system processor of the far-end network element initiates a process to inform all the other label forwarding engines to perform layer 2 label lookup to the alternate switch port. The switch-over of the LSPs to the alternate super-channel is done only if the alternate line card receives the bit in the LSP switch byte owned by the primary super-channel set to 1.

Following ASC information 402 are unused bytes 465, 32-bit cyclical redundancy check information (depicted in FIG. 4 as CRC32 470), a payload 480 (that can include a number of payload data units (PDUs) (not shown)) and byte-interleaved parity information (depicted in FIG. 4 as BIP8 490). Unused bytes 465 can be assigned for expansion of currently defined bytes, or can be reserved for other uses. The 32-bit cyclical redundancy check information that is depicted in FIG. 4 as CRC32 470 can be, for example, a CCITT standard CRC calculated over the frame header bytes with a divisor=0x04C11DB7 and initial remainder=0xFFFFFFFF. The byte-interleaved parity information depicted in FIG. 4 as BIP8 490 can be, for example, a SONET-like bit-interleaved parity to set odd parity over the entire previously-transmitted frame (excepting the SOF information). The structure of payload 480 is describe in connection with FIGS. 16A–16D.

Figure 5:
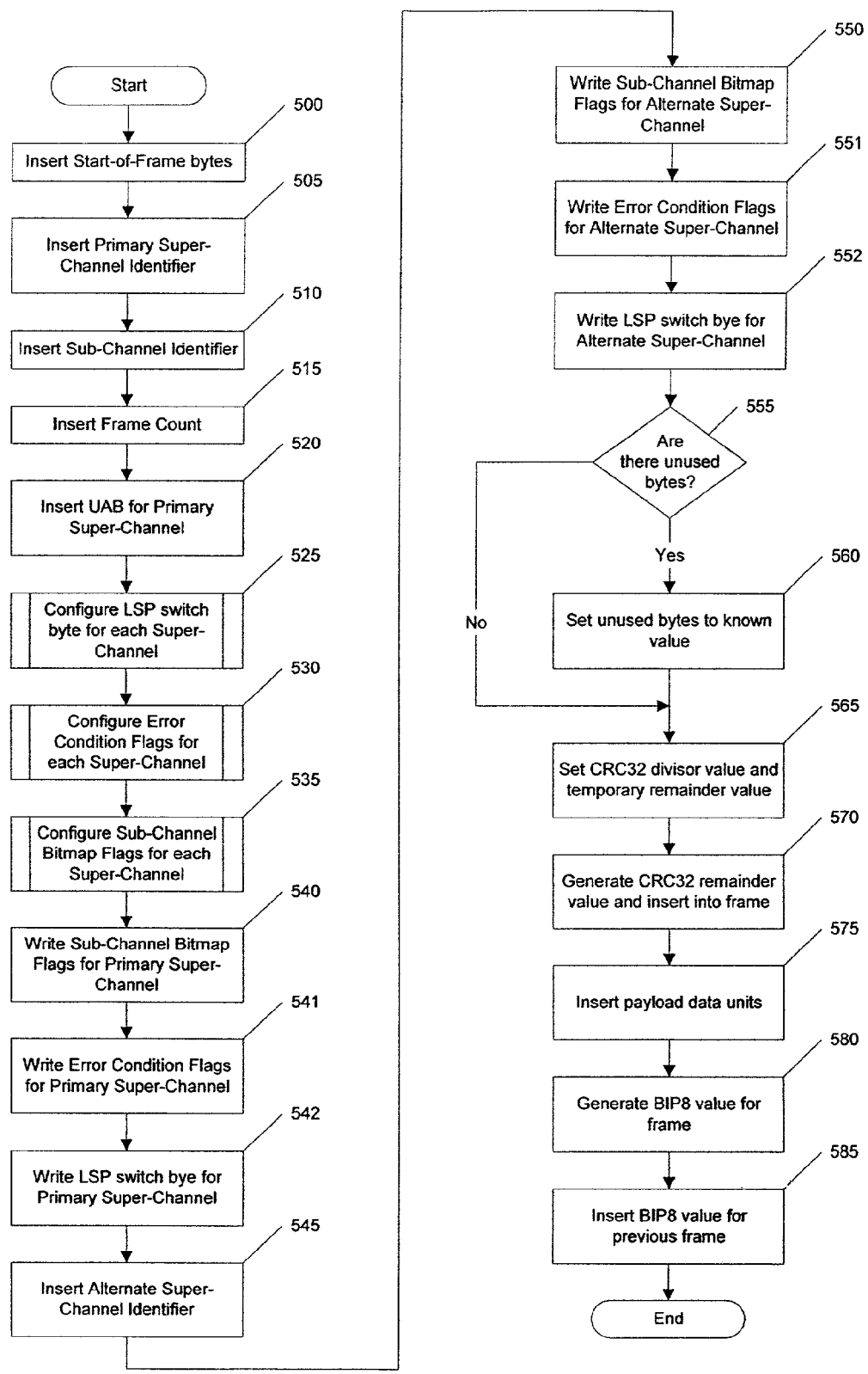
FIG. 5 is a flow diagram illustrating an example process of generating a frame structure according to embodiments of the present invention.

Example Processes for Building a Frame Structure According to Embodiments of the Present Invention FIG. 5 is a flow diagram illustrating an example process of generating a frame structure such as frame structure 400. The process begins with the insertion of start-of-frame bytes (depicted in FIG. 4 as SOF information 405) (step 500). Next, a primary super-channel identifier (e.g., PSC identifier 410) is inserted in the frame (step 505). A sub-channel identifier for the primary super-channel is inserted in the frame (e.g., sub-channel identifier 415) (step 510). A frame count is then inserted into the frame (e.g., frame counter 420) (step 515). If the user so desires, any required user-accessible bytes are then inserted into the frame (step 520).

The LSP switch byte is then configured for each super-channel (step 525). A process for configuring the LSP switch byte is shown in further detail in the flow diagram of FIG. 6. Error condition flags for each super-channel are also configured (step 530). The configuration of error condition flags is shown in further detail in the flow diagram of FIG. 8. Next, the sub-channel identifier bitmap for each super-channel are configured (step 535). The process of configuring the sub-channel bitmap is described in further detail in regard to FIG. 9. The sub-channel bitmap for the primary super-channel is then written into the frame (step 540). Also written into the frame are the error condition flags for the primary super-channel (step 541). The LSP switch byte for the primary super-channel is then written into the frame (step 542).

Next, an alternate super-channel identifier (e.g., ASC identifier 445) is inserted in the frame (step 545). The sub-channel bitmap for the alternate super-channel is then written into the frame (step 550). Also written into the frame are the error condition flags for the alternate super-channel (step 551). The LSP switch byte for the alternate super-channel is then written into the frame (step 551).

At this point in the process, if there are unused bytes (step 555), the unused bytes are set to a known value (step 560). The CRC32 divisor value and temporary remainder value are set (step 565) so that a CRC32 remainder value can be generated over the bytes in the header of the frame (step 570). Once the CRC32 check is performed, the payload data units are inserted in the frame (step 575). A byte-interleaved parity value (BIP8 value) is then generated for the frame (step 580). This BIP8 value will be inserted in the next frame to allow for the detection of errors in the current frame. Finally, the BIP8 value for the previous frame is inserted at the end of the present frame, in a similar fashion. It will be noted that the BIP8 value is actually generated over the frame as the frame is being processed, which is more efficient and potentially simpler than generating the BIP8 value at the end of the frame once the frame has been assembled.

It is appreciated that operations discussed herein with regard to flow diagrams such as that depicted in FIG. 5 may consist of directly entered commands by a computer system user or by steps executed by application specific hardware modules, but the preferred embodiment includes steps executed by software modules. The functionality of steps referred to herein may correspond to the functionality of modules or portions of modules. Moreover, the operations referred to herein may be modules or portions of modules (e.g., software, firmware, hardware or other such modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 5 (as well as those of other the other flow diagrams described herein) may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 6:
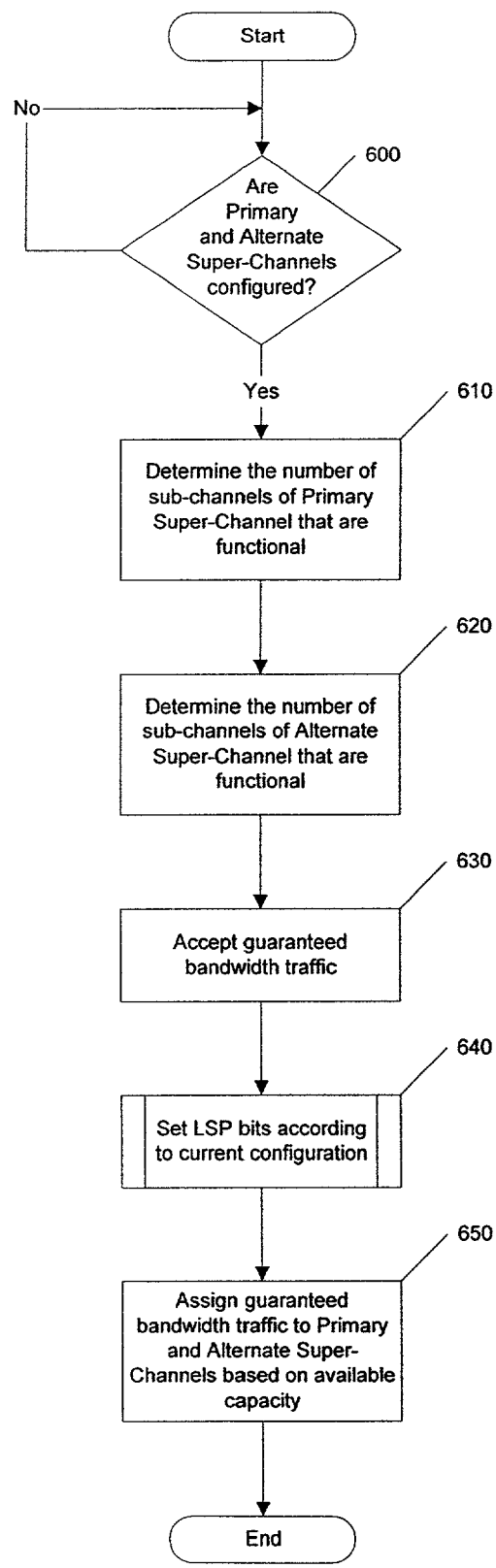
FIG. 6 is a flow diagram illustrating a process for configuring a label-switched path (LSP) switch byte for primary and alternate super-channels according to embodiments of the present invention.

FIG. 6 is a flow diagram illustrating a process for configuring LSP enable flags for primary and alternate super-channels. First, a determination is made as to whether the primary and alternate super-channels need to be configured (step 600). If the primary and alternate super-channels do not need to be configured, the process waits until such time as such configuration is required. If the primary and alternate super-channels do need to be configured, the number of sub-channels of the primary super-channel which are functional is determined (step 610). Similarly, a determination is made as to the number of sub-channels of the alternate super-channel which are functional (step 620). Once these determinations have been made, a determination is made as to the amount of guaranteed bandwidth traffic that can be accepted (step 630). Next, the bits of the LSP switch byte are set according to the current configuration (step 640). This will typically take into account the operational state of the various sub-channels. An example process for performing such configuration is described with regard to FIG. 7. Guaranteed bandwidth traffic is then assigned to the primary and alternate super-channels based on the available capacity of each (step 650).

Figure 7:
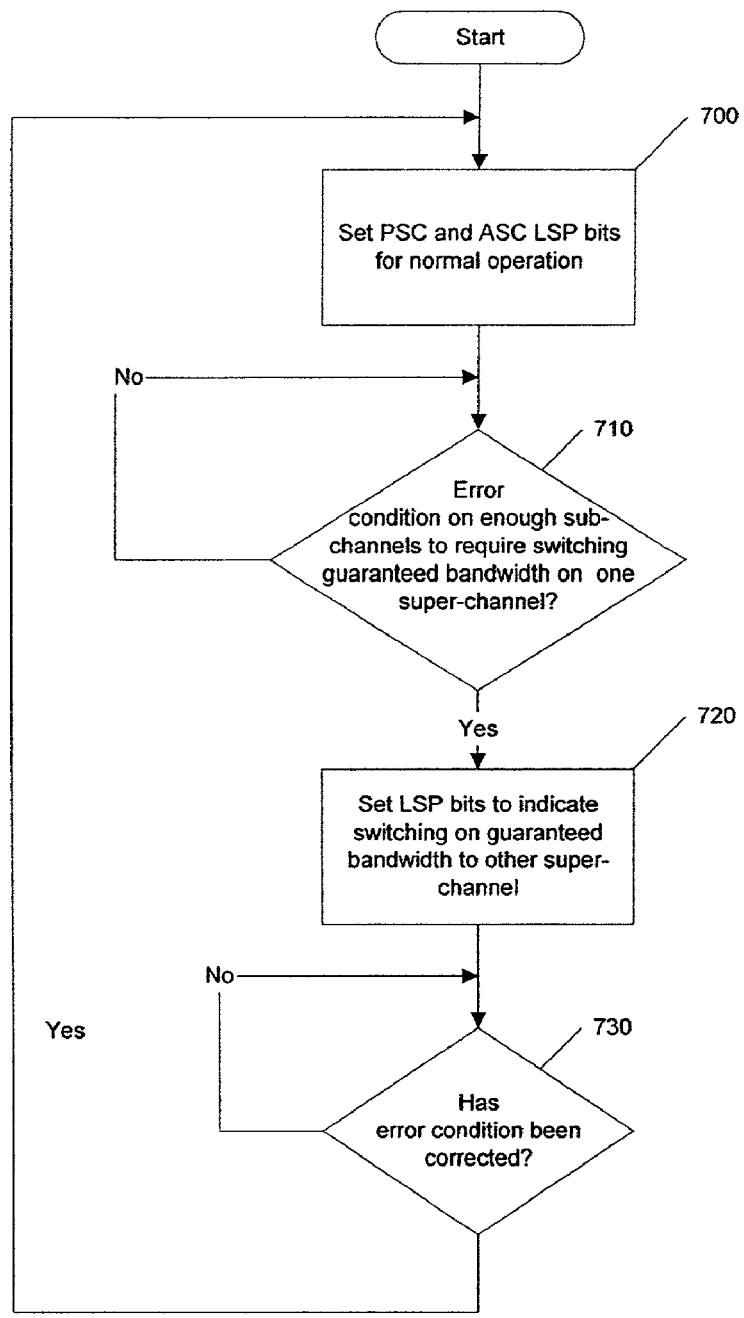
FIG. 7 is a flow diagram illustrating a process of setting bits of an LSP switch byte according to embodiments of the present invention.

FIG. 7 is a flow diagram illustrating a process of setting bits of the LSP switch byte according to a current configuration. The process begins with setting the LSP switch bytes of the primary super-channel and alternate super-channel for normal operation (step 700). In the case where the super-channel's LSP switch bytes are being initialized (e.g., during the process depicted in FIG. 6 (step 640)), this is the only action that need be performed. However, during operation of the super-channels, further actions are typically performed.

In such a case, a determination is then made as to whether error conditions exist on enough of the sub-channels of the given super-channel to require switching the guaranteed bandwidth traffic onto the other super-channel (step 710). While error conditions on the sub-channels remain below the given threshold, and so do not require the switching of guaranteed bandwidth, the process awaits the crossing of that threshold, writing LSP switch bytes for a normal operation to the frames currently being generated. Upon the occurrence of a sufficient number of error conditions on one super-channel (e.g., the primary super-channel), the bits in the LSP switch byte are set to indicate switching of the guaranteed bandwidth to the other super-channel (step 720). While the error conditions persist (step 730), the bits in the LSP switch byte remain set to indicate switching of the guaranteed bandwidth to the other super-channel. Once the error condition has been corrected, the process proceeds by setting bits of each LSP switch byte for normal operation for both the primary and alternate super-channels (step 700).

Figure 8:
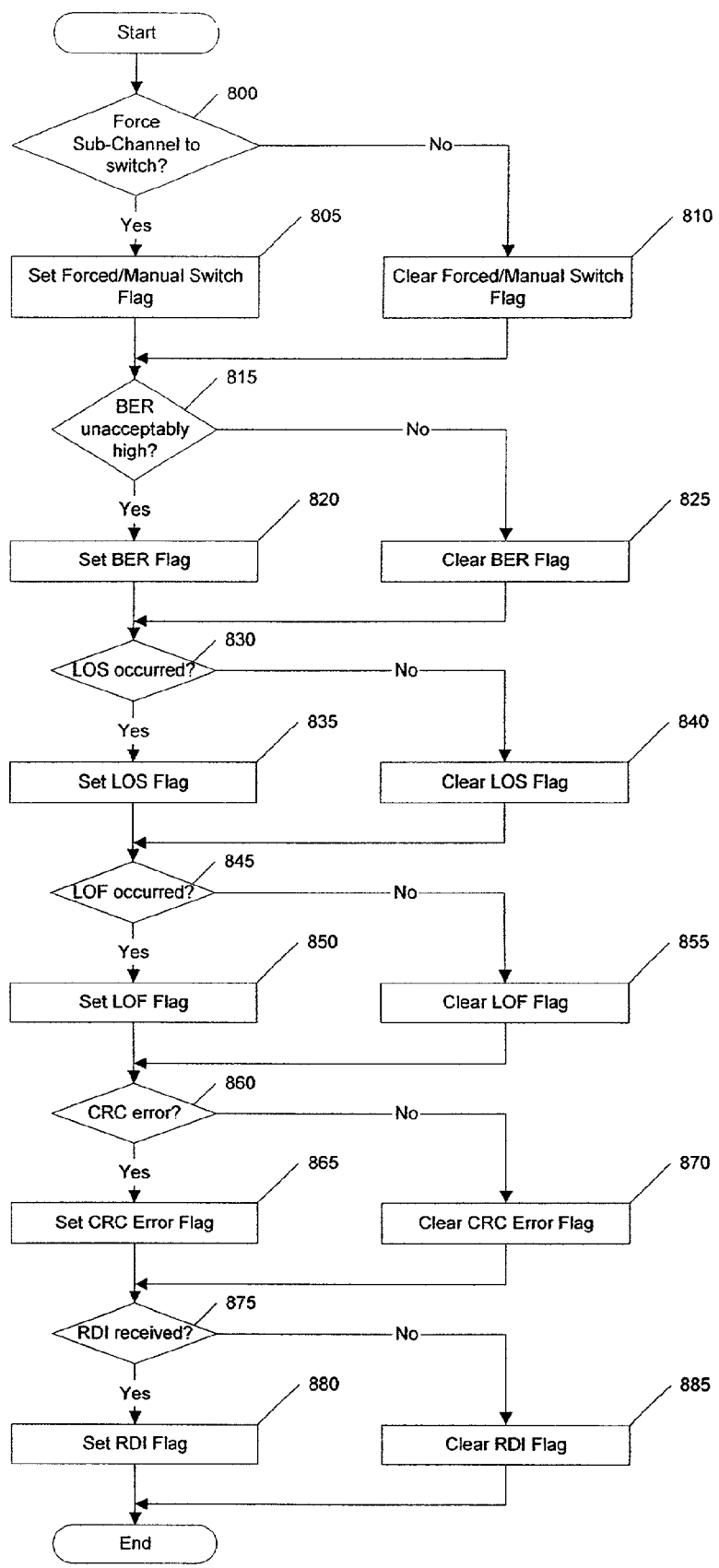
FIG. 8 is a flow diagram illustrating a process of configuring error condition flags according to embodiments of the present invention.

FIG. 8 is a flow diagram illustrating a process of configuring error flags according to embodiments of the present invention. The process begins with a determination as to whether the sub-channel is to be forced to switch (step 800). If the sub-channel is to be forced to switch, a forced/manual switch flag is set, indicating that switching of the sub-channel is to be forced (step 805). Otherwise, the forced/manual switch flag is cleared, indicating that the sub-channel is to be manually switched (step 810). Next, a determination is made as to whether the bit error rate (BER) is unacceptably high (step 815). If the BER is unacceptably high, the BER flag is set (step 820). Otherwise, the BER flag is cleared (step 825). A determination is then made as to whether a loss-of-signal (LOS) has occurred (step 830) If an LOS has occurred, and LOS flag is set (step 835). Otherwise, the LOS flag is cleared (step 840). In a similar fashion, a determination is made as to whether a loss-of-frame (LOF) has occurred (step 845). If an LOF has occurred, an LOF flag is set (step 850). Otherwise, the LOF flag is cleared (step 855). Next, a determination is made, using the CRC32 information, as to whether a CRC error has occurred (step 860). If a CRC error has occurred, a CRC error flag is set (step 865). Otherwise, the CRC error flag is cleared (step 870). Next, a determination is made as to whether to generate a remote defect indicate (RDI) in response to the receipt of an alarm indication signal (AIS) within the frame received (step 875). If an RDI is to be sent, a RDI flag is set (step 880). Otherwise, the RDI flag is cleared (step 885).

Figure 9:
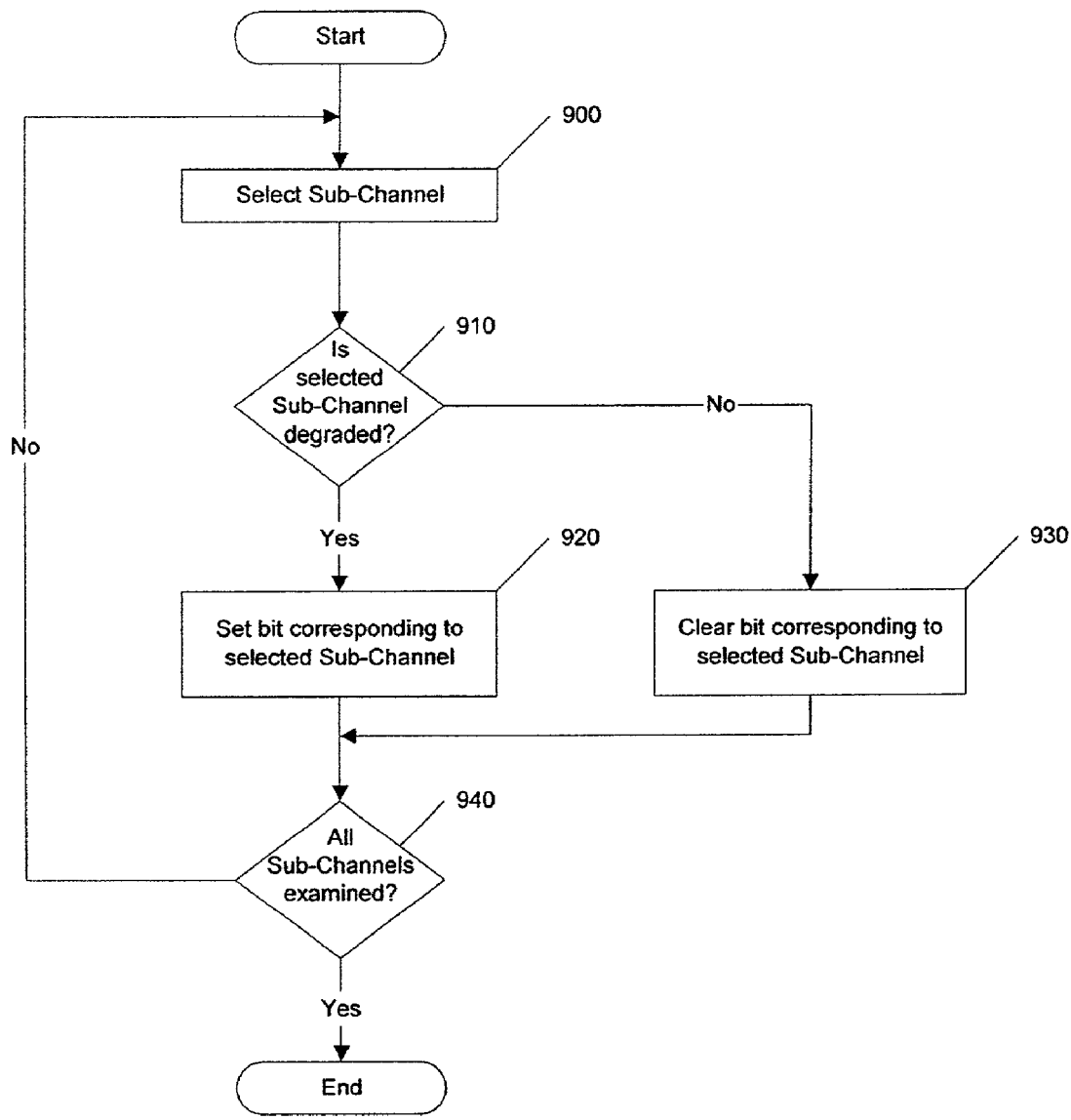
FIG. 9 is a flow diagram illustrating a process of coarse bitmap generation according to embodiments of the present invention.

FIG. 9 is a flow diagram illustrating a process of coarse bitmap generation. This process can be carried out, for example, in making a determination as to the degradation of sub-channels, in deciding whether or not to switch guaranteed bandwidth to another super-channel (e.g., step 710 of FIG. 7). The process begins with a selection of a sub-channel (step 900). A determination is then made as to whether the selected sub-channel is degraded (step 910). If the selected sub-channel is degraded, a bit corresponding to the selected sub-channel is set (step 920). Otherwise, the bit corresponding to the selected sub-channel is cleared (step 930). The process continues until all sub-channels have been examined (step 940).

Example Network Segment Illustrating Sub-Channel Protection and Restoration

Figure 10:
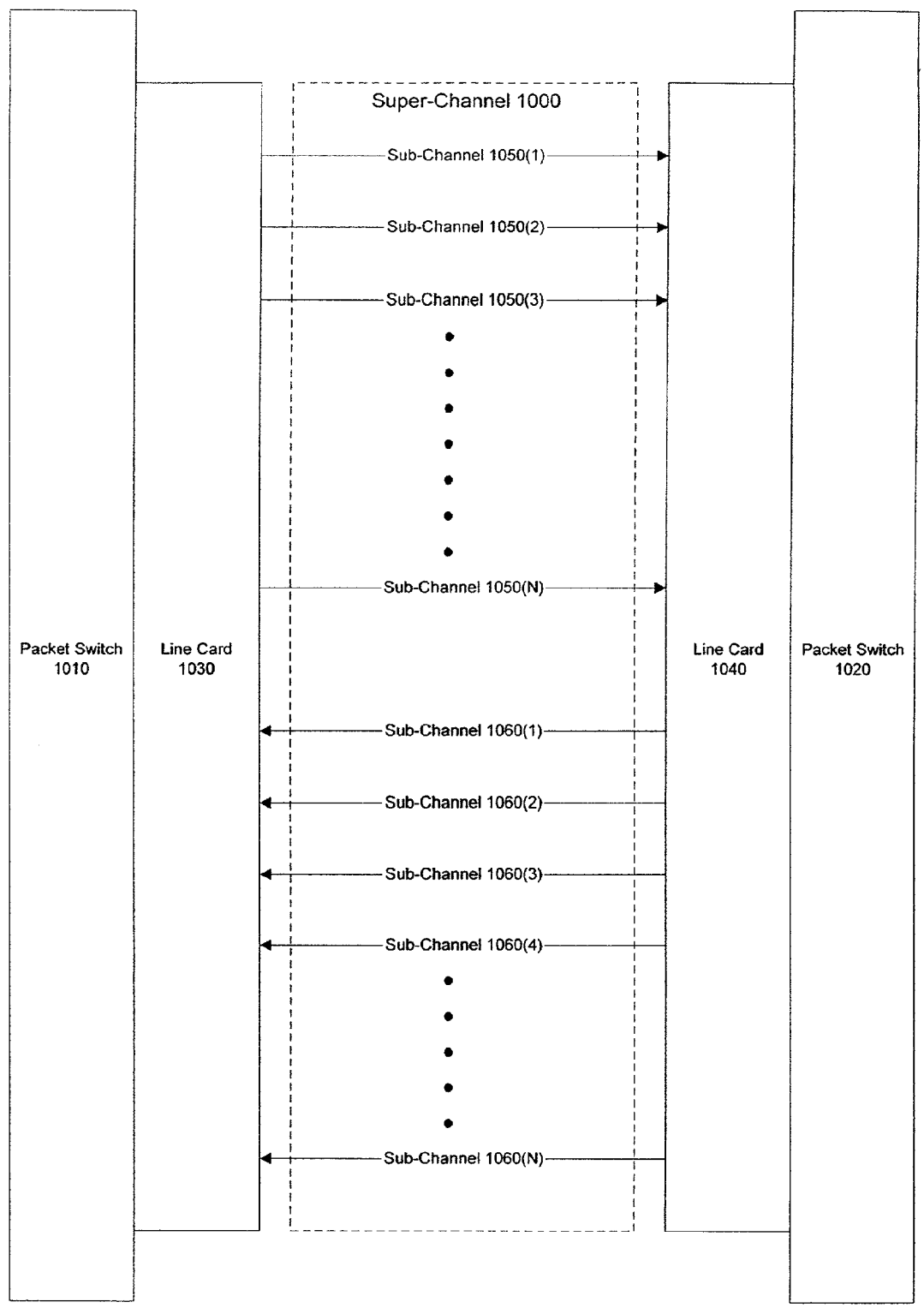
FIG. 10 is a block diagram illustrating a portion of network in further detail that illustrates structure supporting a sub-channel bitmap protection mechanism according to embodiments of the present invention.

FIG. 10 is a block diagram illustrating a portion of network 100 in further detail that illustrates structure supporting a sub-channel bitmap protection mechanism. In this view, a super-channel 1000 connects packets switches 1010 and 1020. Packet switch 1010 communicates with packet switch 1020 via a line card 1030, while packet switch 1020 communications with packet switch 1010 via a line card 1040. It will be noted that, applying terms of art currently in use, that packet switch 1010 is the "west" packet switch, while packet switch 1020 can be referred to as the "east" packet switch. It will also be noted that, in fact, line card 1030 can actually be considered as part of packet switch 1010. Similarly, line card 1040 can be viewed as being incorporated in packet switch 1020. Taking the perspective of packet switch 1010 (i.e., the "west" packet switch), super-channel 1000 includes a number of transmit sub-channels (depicted in FIG. 10 as sub-channels 1050(1)–(N)) and receive sub-channels (depicted in FIG. 10 as sub-channels 1060(1)–(N)). Conversely, packet switch 1020 receives sub-channels 1050(1)–(N), while transmitting sub-channels 1060(1)–(N).

Figure 11:
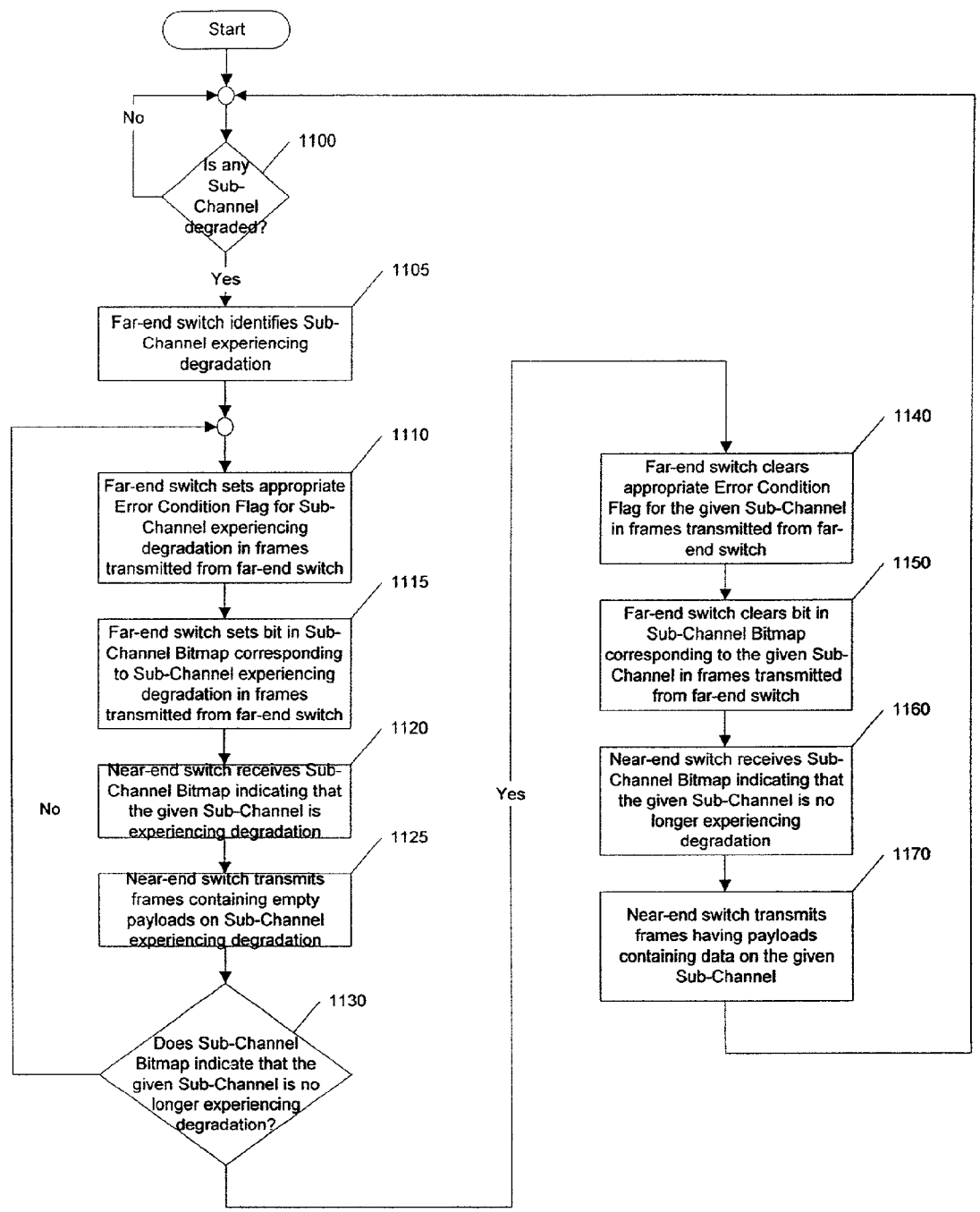
FIG. 11 is a flow diagram depicting a process of sub-channel protection using a sub-channel bitmap protection mechanism according to embodiments of the present invention.

FIG. 11 is a flow diagram depicting a process of sub-channel protection using a sub-channel bitmap protection mechanism that employs, for example, the information provided by PSC sub-channel bitmap 430 of frame 400 in FIG. 4, in an environment such as that depicted in FIG. 10. Fundamentally, this process, in one embodiment, responds to an incoming bitmap indicating that one or more sub-channels are degraded, by inserting empty payloads in outgoing frames. The process begins with a determination as to whether any of the sub-channels (e.g., one of sub-channels 1050(1)–(N)) is degraded (step 1100). It will be noted that, for the sake of generality, the terms "near-end" and "far-end" are used in the present discussion, corresponding to the "east"/"west" terminology used previously (and in the stead of other possible terminologies), so that the discussion may be relative to the ends of the sub-channel that is experiencing errors. Thus, for example, an error on one of sub-channels 1050(1)–(N) would have packet switch 1010 as the "near-end" packet switch, and packet switch 1020 as the "far-end" packet switch. Upon the detection of a degraded sub-channel (step 1100), the far-end switch identifies the sub-channel experiencing degradation (step 1105). The far-end switch then sets the appropriate error condition flag (or flags) for the sub-channel experiencing degradation in frames transmitted from the far-end switch (step 1110). The far-end switch also sets a bit in the sub-channel bitmap corresponding to the sub-channel experiencing degradation in frames that are transmitted from the far-end switch (step 1115). Correspondingly, the near-end switch receives the sub-channel bitmap indicating that the given sub-channel is experiencing degradation (step 1120). The near-end switch then transmits frames containing empty payloads on the sub-channel experiencing degradation (step 1125).

Next, a determination is made as to whether the sub-channel bitmap still indicates that the given sub-channel is experiencing degradation (step 1130). If the sub-channel continues to experience degradation, the far-end switch continues to set the appropriate air condition flags and bit (or bits) in the sub-channel bitmap to indicate to the near-end switch that such degradation continues to occur (steps 1110 and 1115), and the near-end switch receives this information and continues to act upon that information appropriately (steps 1120 and 1125). Once the given sub-channel is no longer experiencing degradation (step 1130), the far-end switch clears the appropriate error condition flag for the given sub-channel in frames transmitted from the far-end switch (step 1140). The far-end switch also clears the appropriate bit (or bits) in the sub-channel bit map corresponding to the given sub-channel in frames transmitted from the far-end switch (step 1150). Correspondingly, the near-end switch receives the sub-channel bit map indicating that the given sub-channel is no longer experiencing degradation (step 1160). The near-end switch then transmits frames having payloads containing data on the given (and now recovered) sub-channel (step 1170).

Referring to FIGS. 10 and 11, an example of the operation of such a sub-channel bitmap protection mechanism can be demonstrated. The following example shows the mechanism behind sub-channel protection and restoration using a sub-channel bitmap. In this example, the West-to-East direction of the super-channel (i.e., super-channel 1000) has three sub-channels (i.e., sub-channels 1050(1)–(3)) and the East-to-West direction as four sub-channels (i.e., sub-channels 1050(1)–(4)), that are in use. Propagation of the sub-channel bitmap during the "Normal" state, "Errored" sub-channel state and the "Restored" state is now discussed. The corresponding error condition flags are also discussed, for reference. The LSP switch byte and error condition flags operate as described previously.

In the normal operating state, the framer transmit section of the West-side packet switch (packet switch 1010) transmits a sub-channel bitmap having its four least-significant bits (LSBits) set to 1 (00001111). The framer transmit section of the East-side packet switch (packet switch 1020) transmits a sub-channel bitmap having its three LSBits set to 1 (00000111). At power-on, the framer receive sections of both the West-side and East-side packet switches are configured to send a sub-channel bitmap having all their bits reset to 0.

An error condition is experienced by sub-channel 1050(1) (e.g., a BER above a user specified threshold), while sub-channel 1050(3) experiences an LOF condition. In this case, the sub-channel bitmap sent by the framer receive section of packet switch 1020 has the LSBit and the third LSBit reset to 0 (00000010). This sub-channel bitmap is sent to the framer transmit section of packet switch 1020, which in turn sends this sub-channel bitmap to the framer transmit section of packet switch 1010 via the framer receive section of packet switch 1010. The bitmap sent to the framer transmit section of packet switch 1010 is not modified.

As soon as the framer transmit section of packet switch 1010 receives a modified bitmap from the framer receive section of packet switch 1010, the framer transmit section of packet switch 1010 searches for 3 consecutive identical sub-channel bitmaps and correlates those sub-channel bitmaps to the sub-channel bitmaps received from the alternate super-channel and authenticates the new sub-channel bitmap state. The new authenticated sub-channel bitmap is then used to send empty payloads into the corresponding sub-channels. The system processor of packet switch 1020 modifies the LSP switch byte (10000000) and error condition flags (byte #1=00000110 and byte #2=00000000) to be sent out by the framer transmit section of packet switch 1020.

When sub-channels 1050(1) and 1050(3) recover from their error conditions, the framer receive section of packet switch 1020 sets the sub-channel bitmap to indicate a normal condition (00000111) and transmits the sub-channel bitmap to the framer transmit section of packet switch 1020 to be transmitted to the framer transmit section of packet switch 1010 via the framer receive section of packet switch 1010. In response to the new sub-channel bitmap, the framer transmit section of packet switch 1010 begins sending live data on sub-channels 1050(1) and 1050(3).

Example Network Segment Illustrating a 1&1 Protection Mechanism

Figure 12:
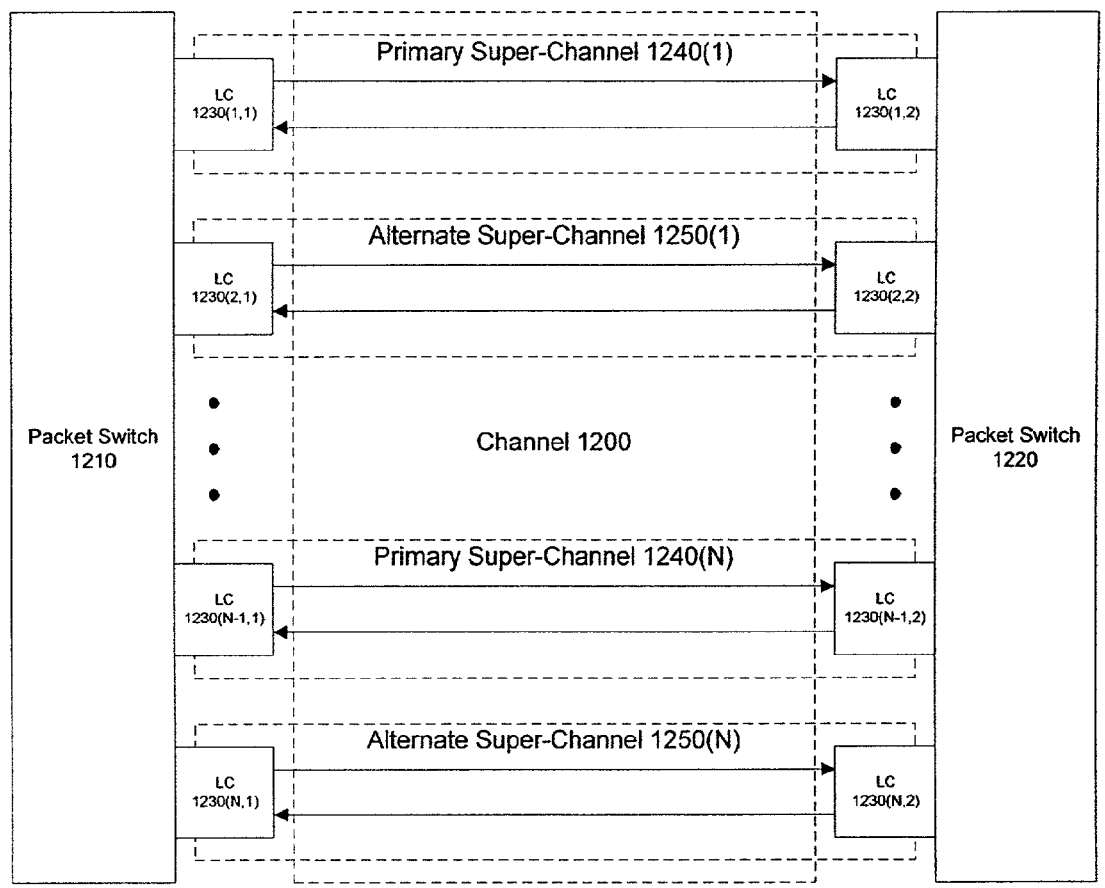
FIG. 12 is a block diagram illustrating a portion of a network in which a channel supports communications between packet switches according to embodiments of the present invention.

FIG. 12 is a block diagram illustrating a portion of network 100 in which a channel 1200 supports communications between a packet switch 1210 and a packet switch 1220. It will be noted that channel 1200 can be viewed as an example of one of channels 120, 125 and 130 of FIG. 1. In a fashion similar to that depicted in FIG. 10, packet switches 1210 and 1220 communicate over channel 1200 using line cards (depicted in FIG. 12 as line cards 1230(1,1)–(N2)). Channel 1200 can be further divided into a number of primary super-channels and alternate super-channels, which are paired together logically to form super-channel pairs that include a primary super-channel and an alternate super-channel. These super-channels are depicted in FIG. 12 as primary super-channels 1240(1)–(N) and alternate super-channels 1250(1)–(N). In certain embodiments of the present invention, the super-channel configuration depicted in FIG. 12 can be used to support a protection scheme referred to herein as a 1&1 super-channel protection scheme.

Figure 13:
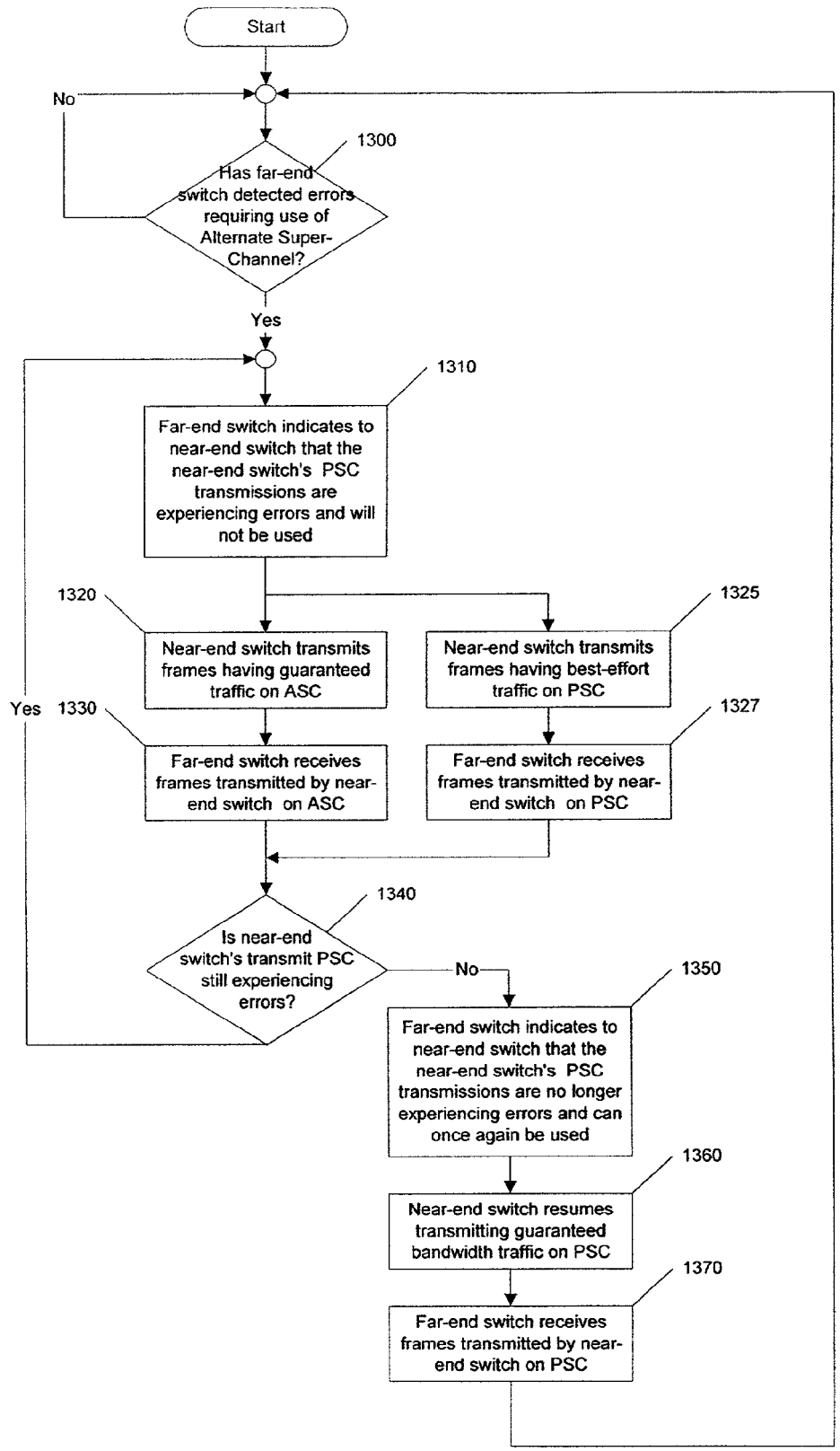
FIG. 13 is a flow diagram illustrating a procedure for switching guaranteed bandwidth traffic between a primary super-channel and an alternate super-channel according to embodiments of the present invention.

FIG. 13 is a flow-diagram illustrating a procedure for switching guaranteed bandwidth traffic between a primary super-channel and an alternate super-channel. In a fashion similar to that of the discussion of FIG. 11, the terms "near-end" and "far-end" are determined by the primary super-channel's transmit channel that is experiencing errors. Moreover, it will be noted that the process is controlled at the system processing level (described in further detail with regard to FIG. 14) in response to the bitmaps generated by the far-end packet switch, and in particular, the framer receive section thereof (e.g., framer receive section 355 of FIG. 3).

The process begins with a determination as to whether the far-end switch has detected errors on a primary super-channel that requires the use of the corresponding alternate super-channel (step 1300). It will be noted that the discussion of FIG. 13 is in terms of guaranteed bandwidth being switched from a primary super-channel to an alternate super-channel. However, the converse is also possible, and should be considered as part of the present discussion. If no such errors are detected (step 1300), the process simply waits for such errors to occur. Upon the occurrence of such errors (step 1300), the far-end switch indicates to the near-end switch that the near-end switch's primary super-channel transmissions are experiencing errors and so will not be used (step 1310).

Next, the near-end switch transmits frames having guaranteed bandwidth traffic on the alternate super-channel in order to provide that guaranteed bandwidth traffic with the bandwidth thus guaranteed (step 1320). The near-end switch continues to transmit best-effort traffic on the primary super-channel, maintaining the bandwidths for the best-effort traffic as is possible (step 1325). The far-end switch, in turn, receives the frames transmitted by the near-end switch on the alternate super-channel (step 1330).

While shifting guaranteed bandwidth to the other super-channel (e.g., the alternate super-channel), the near-end switch continues to transmit frames of best-effort traffic on the original super-channel (the primary super-channel), as best as can be accomplished (step 1325). Correspondingly, the far-end switch receives this best-effort traffic on the primary super-channel (step 1327). As these actions proceed, a determination is made by the far-end switch as to whether the near-end switch's transmit primary super-channel is still experiencing errors (step 1340). If the near-end switch's transmit primary super-channel is still experiencing errors, the alternate super-channel is used to transmit guaranteed bandwidth (steps 1310, 1320 and 1330). Otherwise, the far-end switch indicates to the near-end switch that the transmissions of the near-end switch's primary super-channel are no longer experiencing errors and can once again be used to communicate guaranteed traffic (step 1350). At this point, the near-end switch resumes transmitting data on the now-restored primary super-channel (step 1360). Similarly, the far-end switch begins receiving frames transmitted by the near-end switch on the given primary super-channel (step 1370). The process then proceeds to await further errors (step 1300).

Referring to FIGS. 12 and 13, an example of the operation of such a 1&1 protection mechanism using LSP switch bytes can be demonstrated. As noted, the use of LSP switch bytes (e.g., PSC LSP switch bytes 440 and ASC LSP switch bytes 460) allow guaranteed bandwidth to be switched between super-channels (e.g., from a primary super-channel to an alternate super-channel). Guaranteed bandwidth is bandwidth that is guaranteed to be available to a user of the network, and is guaranteed to be available notwithstanding certain (and even most) network failures. An example of a mechanism that employs LSP switch bytes to allow the switching of guaranteed bandwidth label-switched paths (LSPs) between a primary super-channel and an alternate super-channel in a 1&1 super-channel protection scheme is now described.

Table 4 shows the exchange of LSP switch bytes across primary super-channel 1240(1) and alternate super-channel 1250(1), in the case where an error condition (e.g., BER) causes all three operating sub-channels from the transmit side of LC 1230(1,2) to the receive side of LC 1230(1,1) to be inactive. The recovery from the error is then shown for one of the three sub-channels. Finally, all three sub-channels recover.

TABLE 4

Exchange of LSP switch byte and error condition flags across primary and alternate super-channels in the present example.

| Error Condition | Sub-channel Bitmap (Transmit Side) | LSP Switch Byte (Transmit Side) | Error Condition Flags (Transmit Side) |
|---|---|---|---|
| Normal Operation (3 sub-channels operating) | LC 1230(1, 1) = [00000111]<br>LC 1230(1, 2) = [00000111]<br>LC 1230(2, 1) = [00000111]<br>LC 1230(2, 2) = [00000111] | LC 1230(1, 1) = [10000000]<br>LC 1230(1, 2) = [10000000]<br>LC 1230(2, 1) = [01000000]<br>LC 1230(2, 2) = [01000000] | LC 1230(1, 1) = [00000000]<br>LC 1230(1, 2) = [00000000]<br>LC 1230(2, 1) = [00000000]<br>LC 1230(2, 2) = [00000000] |
| BER on all sub-channels received at LC 1230(1, 2) | LC 1230(1, 1) = [00000111]<br>LC 1230(1, 2) = [00000000]<br>LC 1230(2, 1) = [00000111]<br>LC 1230(2, 2) = [00000111] | LC 1230(1, 1) = [10000000]<br>LC 1230(1, 2) = [00000000]<br>LC 1230(2, 1) = [01000000]<br>LC 1230(2, 2) = [11000000] | LC 1230(1, 1) = [00000000]<br>LC 1230(1, 2) = [00000000]<br>LC 1230(2, 1) = [00000000]<br>LC 1230(2, 2) = [00000000] |
| One of the three sub-channels received at LC 1230(1, 2) recovers | LC 1230(1, 1) = [00000111]<br>LC 1230(1, 2) = [00000100]<br>LC 1230(2, 1) = [00000111]<br>LC 1230(2, 2) = [00000111] | LC 1230(1, 1) = [10000000]<br>LC 1230(1, 2) = [00000000]<br>LC 1230(2, 1) = [01000000]<br>LC 1230(2, 2) = [11000000] | LC 1230(1, 1) = [00000000]<br>LC 1230(1, 2) = [00000000]<br>LC 1230(2, 1) = [00000000]<br>LC 1230(2, 2) = [00000000] |
| BER recovers on all the sub-channels | LC 1230(1, 1) = [00000111]<br>LC 1230(1, 2) = [00000111]<br>LC 1230(2, 1) = [00000111]<br>LC 1230(2, 2) = [00000111] | LC 1230(1, 1) = [10000000]<br>LC 1230(1, 2) = [10000000]<br>LC 1230(2, 1) = [01000000]<br>LC 1230(2, 2) = [01000000] | LC 1230(1, 1) = [00000000]<br>LC 1230(1, 2) = [00000000]<br>LC 1230(2, 1) = [00000000]<br>LC 1230(2, 2) = [00000000] |

Example Network Segment Illustration a 1+1 Protection Mechanism

Figure 14:
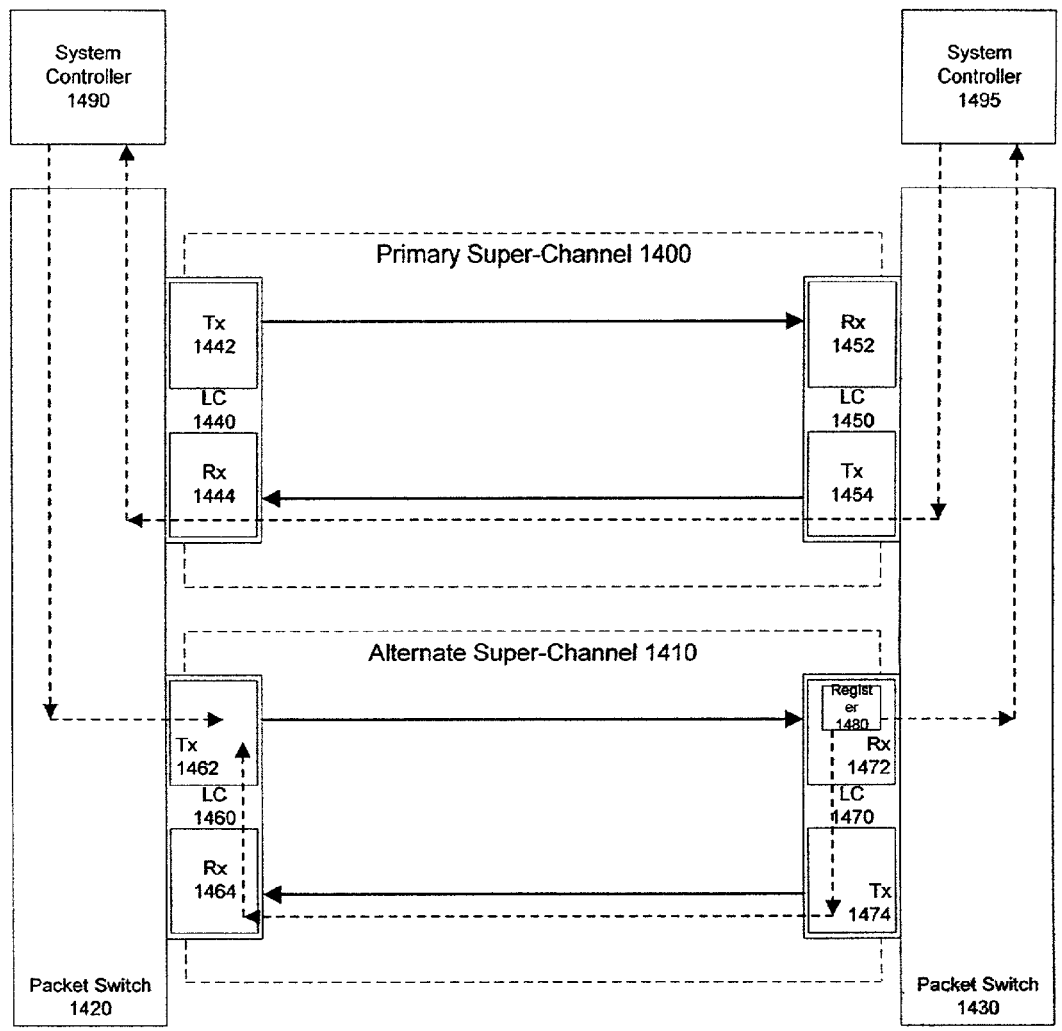
FIG. 14 is a block diagram illustrating a portion of a network in a more detailed example of elements and processes according to embodiments of the present invention capable of supporting 1+1 protection.

FIG. 14 is a block diagram illustrating a portion of network 100 in a more detailed example of elements and processes according to embodiments of the present invention capable of supporting 1+1 protection. In a manner similar to that discussed previously, a primary super-channel 1400 and an alternate super-channel 1410 support communications between a packet switch 1420 and a packet switch 1430. Packet switch 1420 communicates over primary super-channel 1400 via a line card 1440, which includes a transmit section 1442 and a receive section 1444. Packet switch 1430 communicates over primary super-channel 1400 using a line card 1450, which includes a receive section 1452 and a transmit section 1454. In a similar fashion, packet switch 1420 communicates over alternate super-channel 1410 using a line card 1460, which includes a transmit section 1462 and a receive section 1464. Packet switch 1430 communicates over alternate super-channel 1450 using a line card 1470, which includes a receive section 1472 and a transmit section 1474. It will also be noted that receive section 1472 of line card 1470 includes a register 1480, which will be discussed in the description of the example scenario described with regard to FIG. 15. It will also be noted that packet switches 1420 and 1430 are also coupled to system controllers (depicted in FIG. 14 as system controllers 1490 and 1495, respectively), which also play a role in providing channel protection for information communicated over the super-channels depicted in FIG. 14.

Figure 15:
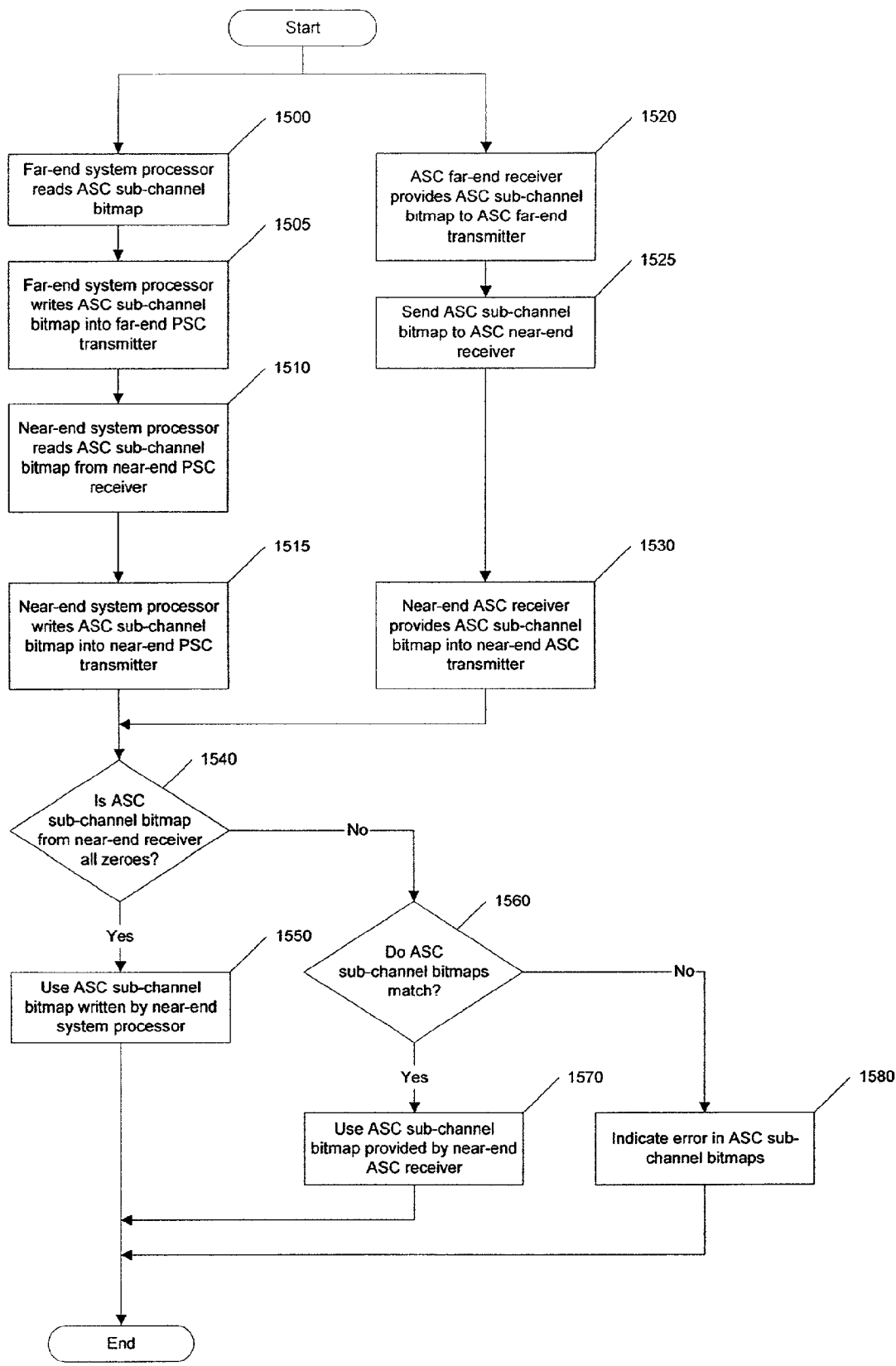
FIG. 15 is a flow-diagram illustrating an implementation of alternate channel protection using the elements depicted in FIG. 14.

FIG. 15 is a flow-diagram illustrating an implementation of alternate channel protection using the elements depicted in FIG. 14. In this example, the far-end switch is the "east" switch (i.e., packet switch 1430), and the near-end switch is the "west" switch (i.e., packet switch 1420). The process begins with several actions being taken in parallel. The far-end system processor reads the alternate super-channel's sub-channel bitmap (step 1500). This is accomplished by having system controller 1495 read sub-channel bitmap information from register 1480. The far-end system processor (system controller 1495) writes the alternate super-channel's sub-channel bitmap into the far-end primary super-channel's transmitter (transmit section 1454 of line card 1450) (step 1505). The near-end system processor (system controller 1490) then reads the alternate super-channel sub-channel bitmap from the near-end primary super-channel's receiver (receive section 1444 of line card 1440) (step 1510). The near-end system processor (system controller 1490) then writes the alternate super-channel's sub-channel bitmap into the near-end primary super-channel's transmitter (transmit section 1462 of line card 1460) (step 1515).

In parallel, several other actions are also taken. The alternate super-channel's far-end receiver (receive section 1472 of line card 1470) can be configured to provide the alternate super-channel's sub-channel bitmap to the alternate super-channel far-end transmitter (transmit section 1474 of line card 1470) (step 1520). The alternate super-channel's sub-channel bitmap is then sent over alternate super-channel 1440 to the alternate super-channel's near-end receiver (receive section 1464 of line card 1460) (step 1525). The near-end alternate super-channel's receiver (receive section 1464) then provides the alternate super-channel's sub-channel bitmap to the near-end alternate super-channel's transmitter (transmit section 1462 of line card 1460) (step 1530).

With these actions having been completed (or, at least, having potentially been completed), the information provided via these two avenues can then be analyzed. First, a determination is made as to whether the alternate super-channel's sub-channel bitmap from the near-end receiver (receive section 1464) is all zeros (step 1540). If so, the alternate super-channel's sub-channel bitmap written by the near-end system processor (system controller 1490) is used (step 1550). Otherwise, a termination is made as to whether the alternate super-channel's sub-channel bitmaps (received from the near-end receiver) (receive section 1464) and the near-end system processor (system controller 1490) match (step 1560). If these sub-channel bitmaps match, the alternate super-channel's sub-channel bitmap provided by the near-end alternate super-channel receiver (receive section 1464) is used (step 1570). Otherwise, if the sub-channel bitmaps do not match, an error is indicated (e.g., an indication to the far-end system processor (system controller 1495) that an error in the alternate super-channel's sub-channel bitmaps has occurred) (step 1580).

Referring to FIGS. 14 and 15, an example of the operation of such an alternate super-channel protection mechanism can be demonstrated. The alternate super-channel protection information functions to carry the sub-channel bitmap and the LSP switch byte of the alternate super-channel, and indicates whether the communication in the return direction is available or not. The alternate super-channel to which the sub-channel bitmap and LSP switch byte belong is indicated by the alternate super-channel identifier field (alternate super-channel identifier 445 of FIG. 4).

The path of the alternate super-channel protection information is shown in FIG. 14. In this example, the primary path of the sub-channel bitmap generated by receive section 1472 (and stored in register 1480) is sent to transmit section 1474. This sub-channel bitmap is also read out by system controller 1495 and written into the memory area of transmit section 1454 that holds alternate super-channel information (e.g., ASC information 402, including the alternate super-channel's ASC identifier (ASC identifier 445), sub-channel bitmap (e.g., ASC sub-channel bitmap 450) and LSP switch byte (e.g., LSP switch byte 460)). In receive section 1444, the alternate super-channel's sub-channel bitmap is read by system controller 1490 and written into transmit section 1462. Transmit section 1462 uses the sub-channel bitmap written by system controller 1490, if the sub-channel bitmap received from receive section 1469 is reset to zero.

It will be noted that, depending upon the implementation and differences in transmission delays experienced by information transiting the two super-channels (PSC and ASC), the arrival of a sub-channel bitmap, communicated via the ASC, at any given transmit section can be delayed by one frame relative to communication of that sub-channel bitmap via its alternate route. It will also be noted that a sub-channel bitmap received by a transmit section via an ASC can also be used to authenticate the bitmap received from the given receive section during normal operation, as noted previously.

Example Payload and PDUs

Figure 16A:
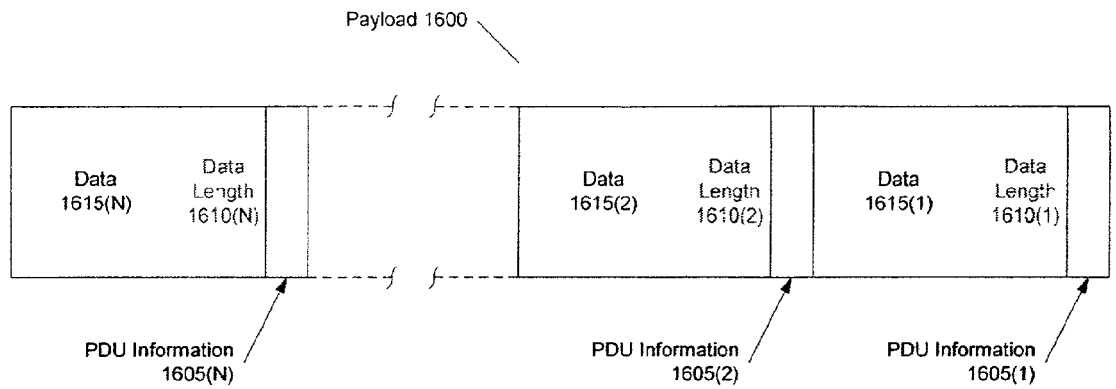
FIG. 16A illustrates a payload according to embodiments of the present invention.

FIGS. 16A, B, C and D together give an example of an overall payload structure that can be used in frame structure 400 of FIG. 4, and so correspond to payload 480 as discussed with regard thereto. FIG. 16A illustrates a payload 1600 that is made up of a number of payload data units (PDUs) that each contain PDU information (depicted in FIG. 16A as one of PDU information 1605(1)–(N)), data length information (depicted in FIG. 16A as data lengths 1610(1)–(N)), and the data being transported (depicted in FIG. 16A as data 1615(1)–(N)). In one embodiment, PDU information includes parity information (e.g., a parity bit; not shown), a partial PDU indicator (not shown) and a queue identifier (not shown).

In the embodiments depicted herein, a payload such as payload 1600 is 155,439 bytes in length, and is made up of 303 PDUs. Each PDU carries up to 512 bytes of raw data. If the raw data in the PDU is less that 512 bytes, then the PDU carries up to 510 bytes of raw data and two bytes that describe the number of bytes of raw data. The payload data units of payload 1600 can, in one embodiment of the present invention, therefore be configured in one of three ways. Such configurations are shown in FIGS. 16B, 16C and 16D.

Figure 16B:
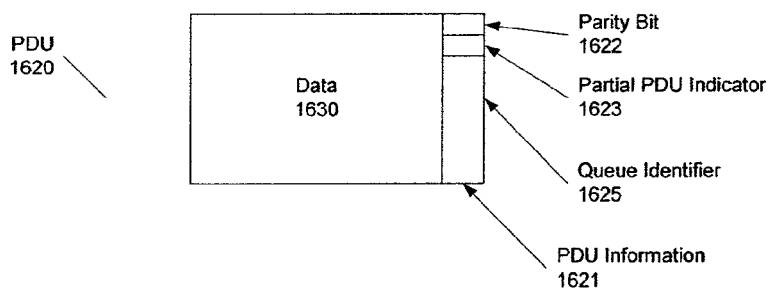
FIG. 16B is a diagram showing a fully filled payload data unit according to embodiments of the present invention.

FIG. 16B is a diagram showing a payload data unit that is filled to capacity. Payload data unit 1620 includes PDU information 1621 (which, in turn, includes a parity bit 1622, a partial PDU indicator 1623 and a queue identifier 1625) and data 1630. In this configuration, parity bit 1622 sets parity (e.g., odd parity). Parity bit 1622 sets (odd) parity over the lower 7 bits of the PDU information. During payload recovery in the receive section receiving the given PDU, the PDU is discarded if a parity error is detected thereby. This check is in place to avoid a PDU reaching the wrong queue within the receive section.

A partial PDU indicator such as partial PDU indicator 1623 indicates whether or not the given PDU is full. If partial PDU indicator 1623 is set to 1, the PDU is a partial PDU and the next 2 bytes indicate the number of bytes of raw data in that PDU. Otherwise, if partial PDU indicator 1623 is 0, then either the following 512 bytes are all raw data, or none are raw data (i.e., the frame is empty). In this example, partial PDU indicator 1623 is set to 0 to indicate that PDU 1620 is not a partially-filled PDU. Queue identifier 1625 identifies the input queue from which data 1630 originated (and so the output queue to which data 1630 should be sent), and so supports the sequencing of PDUs in payload formation. In this embodiment, queue identifier 1625 is 6 bits long, and so is capable of identifying one of 64 queues (e.g., one of queues 1–64). It will be noted that there is no need for data length information in such a PDU because PDU 1620 is full and so is of a fixed length (e.g., in which data 1630 is 512 bytes).

Figure 16C:
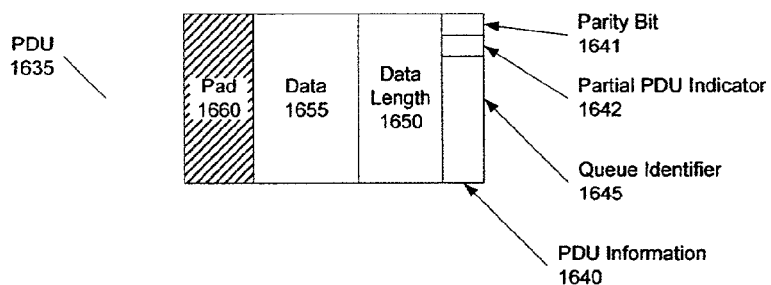
FIG. 16C is a diagram illustrating a partially-filled payload data unit according to embodiments of the present invention.
Figure 16D:
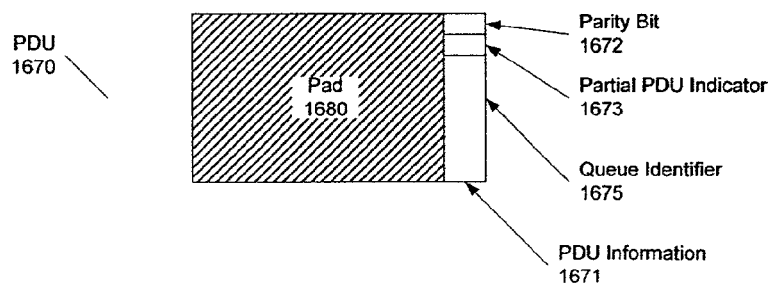
FIG. 16D is a diagram illustrating what is referred to herein as an "empty" payload data unit according to embodiments of the present invention.

FIG. 16C is a diagram illustrating a partially-filled payload data unit (depicted in FIG. 16C as a payload data unit 1635). Payload data unit 1635 includes PDU information 1640 (which, in turn, includes a parity bit 1641, a partial PDU indicator 1642 and a queue identifier 1645), a data length 1650, data 1655 and a pad 1660. In this configuration, parity bit 1641 sets parity (e.g., odd parity) and partial PDU indicator 1642 is set to 1 to indicate that PDU 1635 is only partially-filled. Again, because PDU 1635 contains data (that needs to be directed to a queue), PDU information 1640 includes queue identifier 1645, which identifies one of 64 queues (e.g., one of queues 1–64).

Unlike payload data unit 1620, however, payload data unit 1635 contains information regarding the length of the data being transported (e.g., the number of data bytes), as data length 1650. A payload data unit such as payload data unit 1635 is employed in the situation where the data from a given input queue is insufficient to fill the given payload data unit (e.g., payload data unit 1635). Thus, because data 1655 fails to fill payload data unit 1635 (and, in this embodiment, the size of a PDU is fixed), pad 1660 is required. Pad 1660 can be, for example, bytes set to a value of 0xAA (which allows for the maintenance of clock synchronization), although other values can be used. In this situation, data length 1650 stores a value representing the amount of data (i.e., the length of data 1655).

FIG. 16D is a diagram illustrating what is referred to herein as an "empty" payload data unit (depicted in FIG. 16D as a payload data unit 1670). Payload data unit 1670 includes PDU information 1671 (which, in turn, includes a parity bit 1672, a partial PDU indicator 1673 and a queue identifier 1675) and a pad 1680. In a fashion similar to payload data unit 1620, because the length of the data is known (here, the length of the data is zero), there is no need for data length information (e.g., data length 1650). Because the data length is zero, the data area of payload data unit 1670 is all padding (i.e., pad 1680). As before, pad 1680 can be, for example, bytes set to a value of 0xAA. In this configuration, parity bit 1672 sets parity (e.g., for odd parity in the given case, parity bit 1641 is set to 1). Partial PDU indicator 1673 is set to 0 to indicate that PDU 1670 is not a partially-filled PDU. Because PDU 1670 contains no data, queue identifier 1675 can be set to a null value (e.g., a queue identifier of 0). An empty payload data unit such as payload data unit 1670 is used in the situation where there is no further data to be transported.

Example Transmit Section and Operation Thereof

Figure 17:
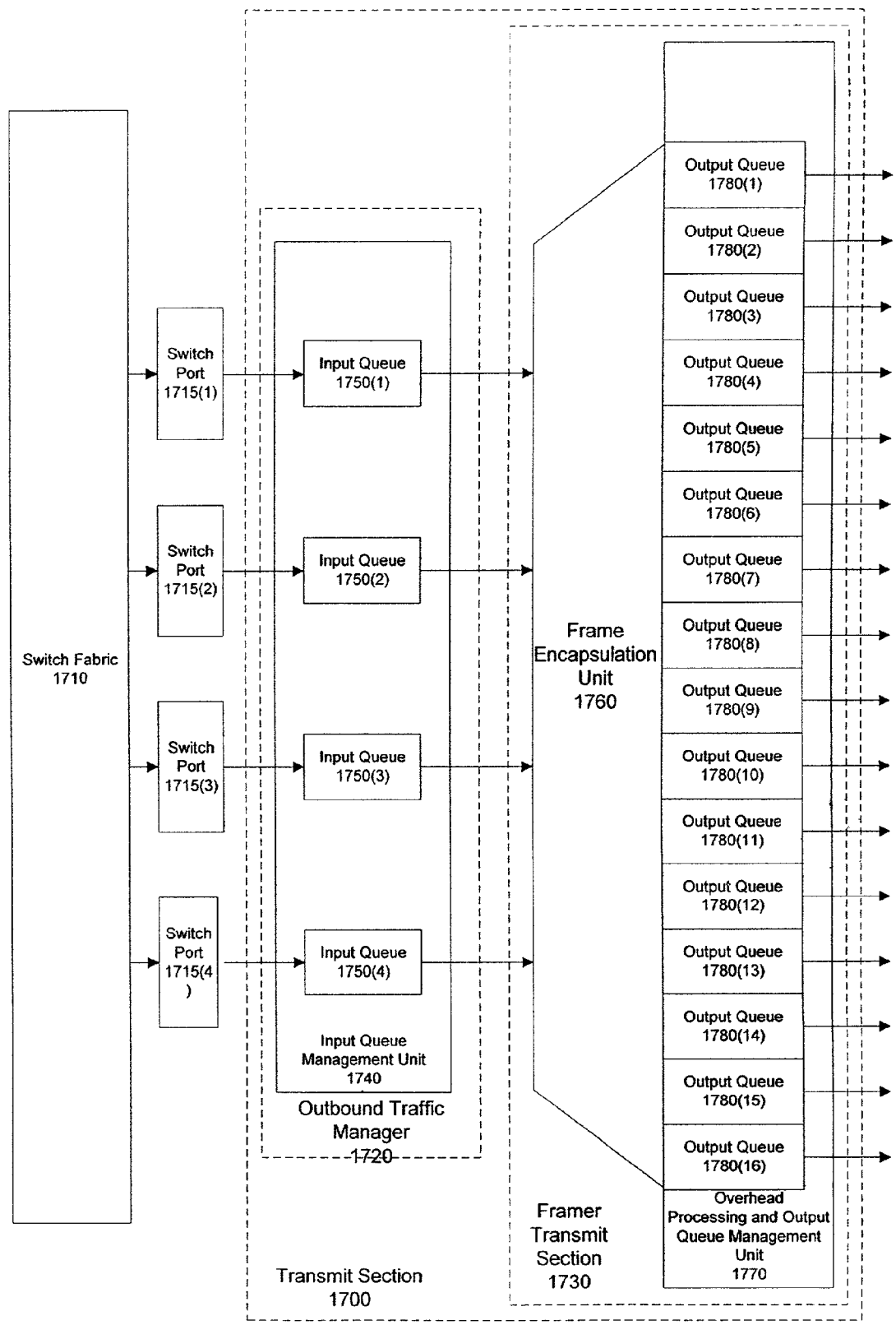
FIG. 17 is a block diagram showing in further detail a transmit section according to embodiments of the present invention.

FIG. 17 is a block diagram showing in further detail transmit section 327 of FIG. 3 (depicted in FIG. 17 as a transmit section 1700). A switch fabric 1710 is coupled to transmit section 1700 via switch ports 1715(1)–(4). It will be noted that switch ports 1715(1)–(4) correspond to transmit ports 315(1)–(N) of FIG. 3. Transmit section 1700 includes an outbound traffic manager 1720 and a framer transmit section 1730. Outbound traffic manager 1720 corresponds to outbound traffic manager 320 of FIG. 3, and couples switch ports 1715(1)–(4) to framer transmit section 1730. Framer transmit section 1730 corresponds to framer transmit section 325 of FIG. 3 and couples outbound traffic manager 1720 to the line cards of the given packet switch. Outbound traffic manager 1720 includes an input queue management unit 1740 that, in turn, includes input queues 1750(1)–(4). Input queues 1750(1)–(4) couple switch ports 1715(1)–(4), respectively, to framer transmit section 1730. Framer transmit section 1730, in turn, includes a frame encapsulation unit 1760 and an overhead processing and output queue management unit 1770. Frame encapsulation unit 1760 takes data from input queues 1750(1)–(4) and encapsulates that data in frames having a structure such as that depicted as frame structure 400 of FIG. 4. Frame encapsulation unit 1760 provides this framed data to a number of output queues (depicted in FIG. 17 as output queues 1780(1)–(16)). As can be seen from the illustration of FIG. 17, the four datastreams from switch fabric 1710 are ultimately divided into 16 output datastreams which are queued, respectively, by output queues 1780(1)–(16).

Each of the sub-channels' frames can carry payloads having PDUs that, in turn, carry raw data bytes originating from more than one source (i.e., input queue). In a packet-switched application, the raw data can come from more than one switch fabric port (more than one of switch fabric ports 1715(1)–(4)). The 510 (or 512) bytes of raw data in each PDU belongs to only one of transmit section inputs, the identity of which is indicated by the queue identifier byte.

The functions performed by input queue management unit 1740 include, among others:
1. The ability to accept raw data bytes from switch ports 1715 (1)–(4) (e.g., via an interface bus (not shown)) and encapsulate this incoming raw data, although this encapsulation can be disabled (e.g., if IP packet encapsulation has already been performed);
2. The ability to indicate to one or more of switch ports 1715(1)–(4) that they should stop accepting data, when the given one of input queues 1750(1)–(4) is full (as may happen when the outgoing sub-channel bandwidth is less than incoming port bandwidth);
3. The ability to indicate the size of each of input queues 1750(1)–(4) to frame encapsulation unit 1760.

Functions performed by frame encapsulation unit 1760 include, among others:
1. The ability to dequeue 512 bytes of raw data from each non-empty one of input queues 1750(1)–(4) (e.g., in round robin fashion), append PDU information to the given PDU and enqueue the PDU in a valid one of output queues 1780(1)–(16) (e.g., in round robin fashion). Which of output queues 1780(1)–(16) are valid is indicated by the given super-channel's currently-authenticated sub-channel bitmap.
2. If any of input queues 1750(1)–(4) contains less than 512 bytes, then up to 510 bytes are dequeued, and a data length and PDU information are prepended to the raw data. If the given one of input queues 1750(1)–(4) contains less than 510 bytes, frame encapsulation unit 1760 appends pad bytes (e.g., containing 0xAA) to the raw data as padding, and the data length field containing the number of bytes read from the given one of input queues 1750(1)–(4).
3. If all the input queues are empty, frame encapsulation unit 1760 generates 512 pad bytes (0xAA) and appends empty PDU information (e.g., all 0x00) before enqueuing the PDU into one of output queues 1780(1)–(16).

The dequeue event is scheduled according to the following example. For a transmit section having 16×10 Gbps outputs and 4×40 Gbps inputs, there are four input dequeue events scheduled in one output PDU time. At every dequeue event, up to 4 PDUs are dequeued from non-empty input queues. If the number of active input queues is less than 4, only that many PDUs are dequeued in the given dequeue event. In one embodiment, a strict round robin is maintained during the next input PDU event such that all the non-empty input queues are served fairly.

Functions performed by overhead processing and output queue management unit 1770 include, among others:
1. The ability to form the overhead for each of the sub-channels' frames. Information such as the super-channel identifier, UAB and alternate super-channel protection information are read from registers that are written (e.g., during initialization or during frame processing) by the system processor. The sub-channel bitmap, the error condition flags and LSP switch bytes are written by the corresponding receive section.
2. The ability to calculate error detection/correction information (e.g., a CRC 32 value) over the overhead bytes and append that error information to the end of the overhead.
3. The ability to append the overhead bytes to 303×513 byte PDUs, as generated by frame encapsulation unit 1760.
4. The ability to compute BIP 8 parity over the frame (except SOF information), and insert the resulting value after the PDUs.

Figure 18:
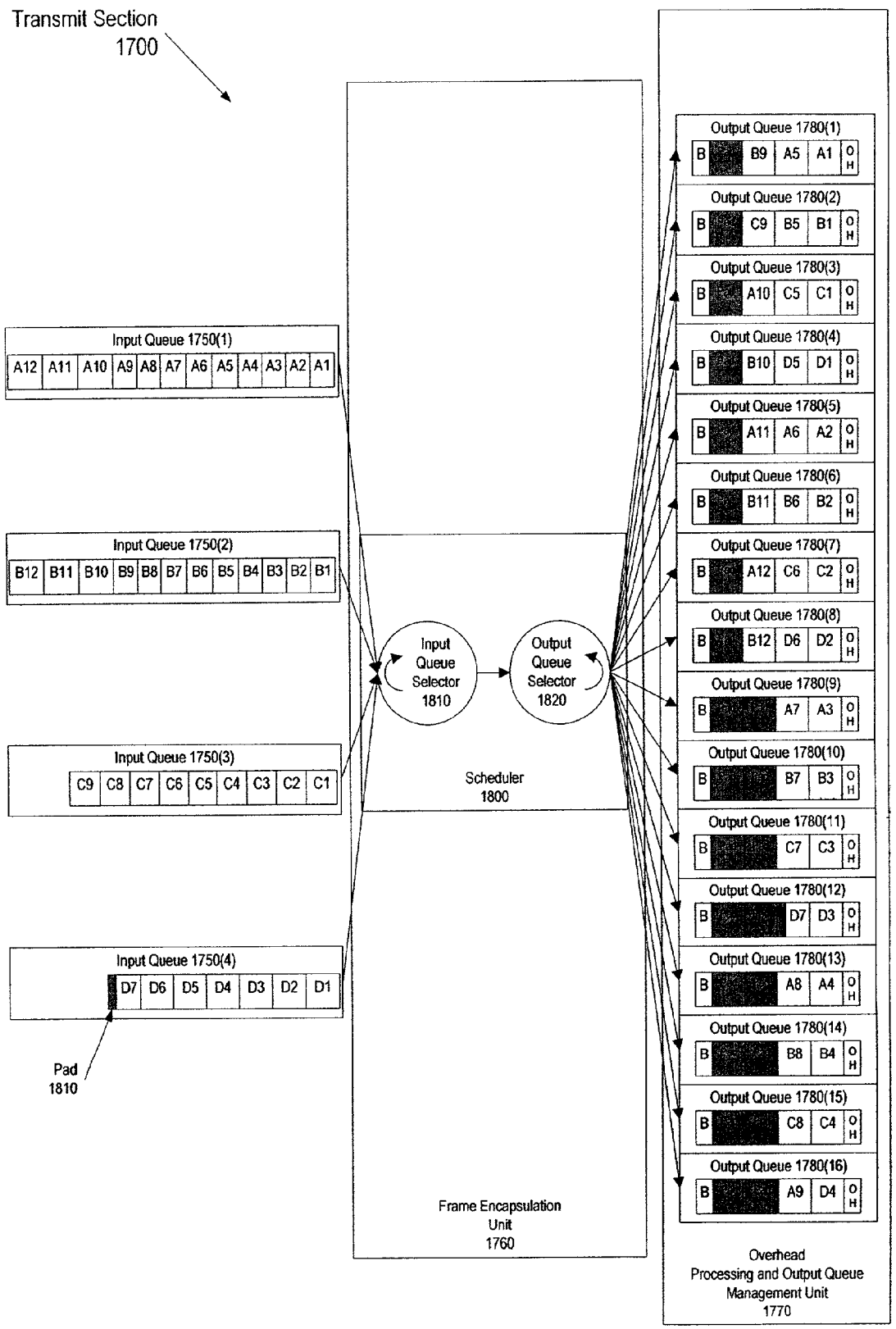
FIG. 18 is a block diagram illustrating an example of the operation of transmit section according to embodiments of the present invention.

FIG. 18 is a block diagram illustrating an example of the operation of transmit section 1700. As previously noted, input queues 1750(1)–(4) are coupled to frame encapsulation unit 1760, which is, in turn, coupled to output queues 1780(1)–(16). In FIG. 18, framing encapsulation unit 1760 is shown in further detail as including a scheduler 1800. Scheduler 1800 can be configured, for example, to implement a round-robin technique (such as that previously mentioned) for both taking input from input queues 1750 (1)–(4), as well as for distributing payload data units to output queues 1780(1)–(16). Scheduler 1800 includes an input queue selector 1810 and an output queue selector 1820. Input queue selector 1810 couples a selected one of input queues 1750(1)–(4) to output queue selector 1820. In a similar fashion, output queue selector 1820 couples the output of input queue selector 1810 to a elected one of output queues 1780(1)–(16).

Each of the blocks of data in input queues 1750(1)–(4) are designated by a letter indicating in which of input queues 1750(1)–(4) the data block had been stored, and a number indicating its position in the given input queue. In a similar fashion, the generation of frames and their storage in output queue 1780(1)–(16) are shown. It will be noted that the last data block in input queue 1750(4) (designated D7) is a partial data block (similar to PDU 1635 of FIG. 16C) and includes a pad 1830.

Figure 19:
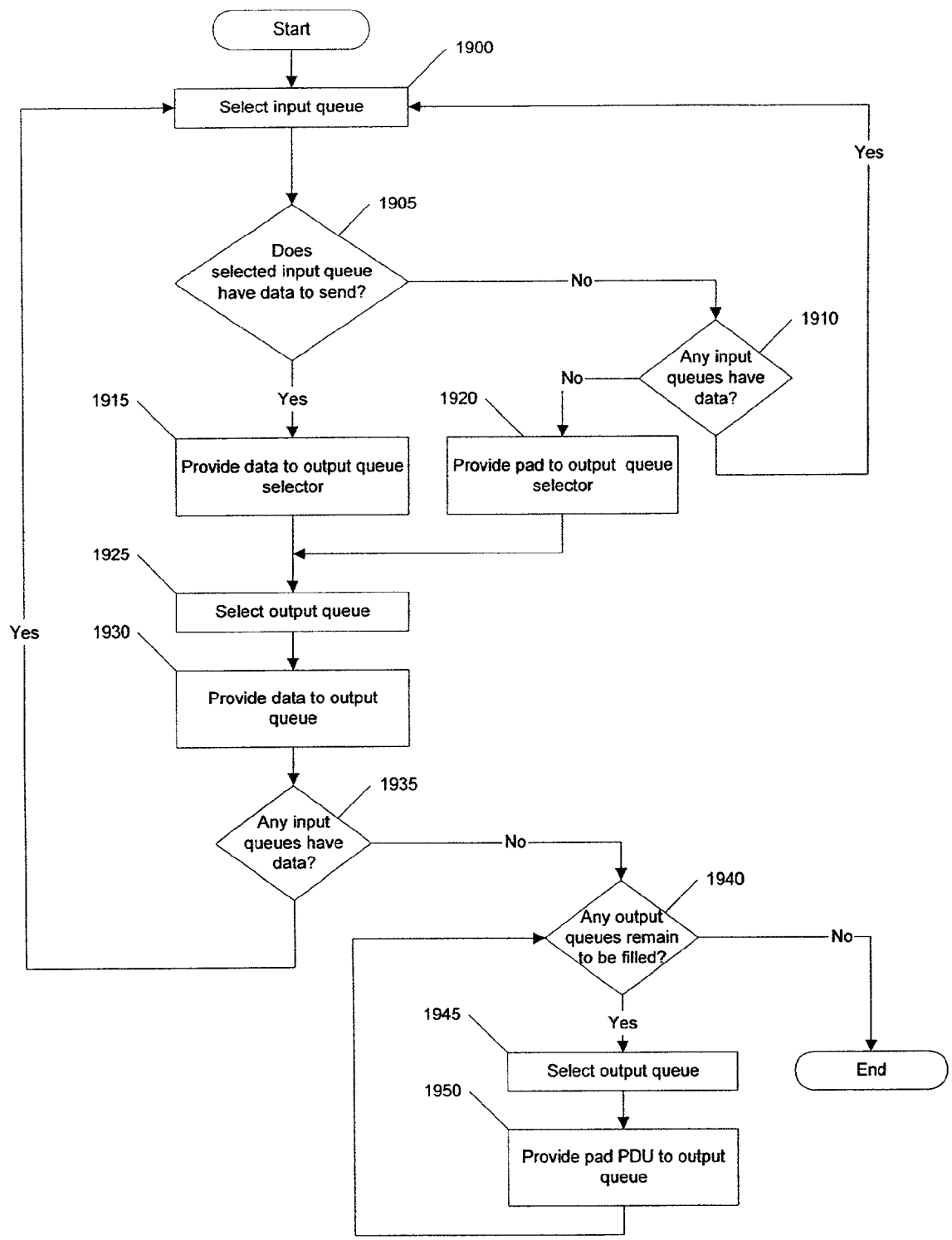
FIG. 19 is a flow diagram illustrating the process of generating frames according to embodiments of the present invention.

FIG. 19 is a flow diagram illustrating the process of generating frames from the blocks of data depicted in FIG.

18, using as an example the previously-mentioned round-robin technique. The process of creating frames from input data blocks begins with the selection of the input queue by scheduler 1800 (step 1900). A determination is then made as to whether the selected input queue contains data (step 1905). If other of the input queues contain data (step 1910), the process selects another input queue (step 1900) to examine (step 1905). If the selected input queue contains data (step 1905), that data is provided to the output queue selector (step 1915). However, if neither the selected input queue nor any of the other input queues contain data (steps 1905 and 1910), an empty payload data unit (pad PDU) is provided to the output queue selector (step 1920). The output queue selector selects the output queue to which the data should be sent and provides that data to the selected output queue (steps 1925 and 1930). If any of the input queues contain data (step 1935), another of the input queues is selected (step 1900). Otherwise, a determination is made as to whether any of the output queues have incomplete frames (step 1940). If such is the case, one of the remaining output queues is selected (step 1945) and pad data is provided to that output queue to pad the frame in question (using a padded PDU such as PDU 1670 of FIG. 16D) (step 1950). This process continues until the remaining frames have been appropriately padded.

Transmit section 1700 has, in one embodiment, four main components: outbound traffic manager 1720 (including input queue management unit 1740), scheduler 1800, overhead processing and output queue management unit 1770 and a register interface for configuration and control (not shown). In the embodiment depicted in FIG. 18, there is one input queue (e.g., one of input queues 1750(1)–(4)) for each input port of frame encapsulation unit 1760 and one output queue (i.e., one of output queues 1780(1)–(16)) associated with each sub-channel output from transmit section 1700. The register interface allows the system processor and receive section to monitor and control the operation of transmit section 1700. The functions implemented in each of these components are further explained below.

In one embodiment, the input to outbound traffic manager 1720 (and so transmit section 1700) assumes an Utopia-IV- or CSI-X-style bus interface at its input. Outbound traffic manager 1720 accepts the user data in the form of fixed sized bus transfer units (BTUs). While the BTU size indicates the maximum size of single data transfer across the bus, small transfers are allowed. The received data is stored in input queues 1750(1)–(4). A flow control mechanism providing input traffic control can employ pre-defined high/low watermarks, dynamic control or other methods. When the input traffic is packet stream and transmit section 1700 is configured to preserve packet boundaries, HDLC-like framing can be used to preserve the packet boundaries through the PDU assembly/re-assembly process.

Scheduler 1800 is responsible for building PDUs from the input data taken from various ones of input queues 1750(1)–(4). Scheduler 1800 preferably provided the following functionalities:

1. Minimize PDU fragmentation (i.e., partial PDUs);
2. Ensure fair output bandwidth sharing between all input ports under normal and degraded conditions;
3. Ensure fair bandwidth sharing between inputs, irrespective of input traffic type (packet/cell/TDM stream), traffic profile (packet size distribution), interface BTU size and speed, and the like.

In one embodiment, an internally generated PDU_COLLECT event is employed. This event is generated at every input PDU interval (i.e., the time required to receive a single PDU's worth of data on the input port). Such an implementation assumes that all the input ports have the same maximum data rate. If such is not the case, then the PDU_COLLECT event can be scheduled corresponding to the fastest input port and a weighted round robin scheme used between input ports to avoid partial PDUs and allow fair bandwidth sharing.

At each PDU_COLLECT event, input queues 1750(1)–(4) are scanned in a round-robin fashion, and a PDU (either full or partial) is formed from each non-empty input queue. This is typically contingent upon an output queue (i.e., one of output queues 1780(1)–(16)) is available for the given PDU. The maximum number of PDUs created during each PDU_COLLECT event is preferably equal to the number of input ports. A queue identifier is prepended to the PDU to indicate the identity of the input buffer queue from which PDU was created. A partial PDU indicator is used to indicate a partial PDU, in the case where the input queues did not have a sufficient amount of data was available. In such a case, data length information is also prepended to the PDU, in the manner noted previously. It will be noted that multiple packets can be combined into a single PDU without transmit section 1700 being aware of any existing packet boundaries, if any.

In one embodiment, each one of overhead processing and output queue management unit 1770 includes a single PDU buffer, one for each sub-channel being output. Overhead processing and output queue management unit 1770 maintains output frame synchronization across all sub-channels, as well as generating SOF information and a frame header every 125 μs, followed by 303 PDUs of 513 bytes each. Overhead processing and output queue management unit 1770 has two states, SFTX_SOF and SFTX_PDU. An SOF is sent in the SFTX_SOF state, after which state is changed to SFTX_PDU, in which PDUs are sent out. A SUBCHL_TX event is generated using any one of the sub-channels as timing reference. On every SUBCHL_TX event, when in SFTX_PDU state, a PDU from output queues 1780(1)–(16) is sent. If the one of output queues 1780(1)–(16) for a given sub-channel is empty, then an empty PDU is sent on that sub-channel.

Example Receive Section and Operation Thereof

Figure 20:
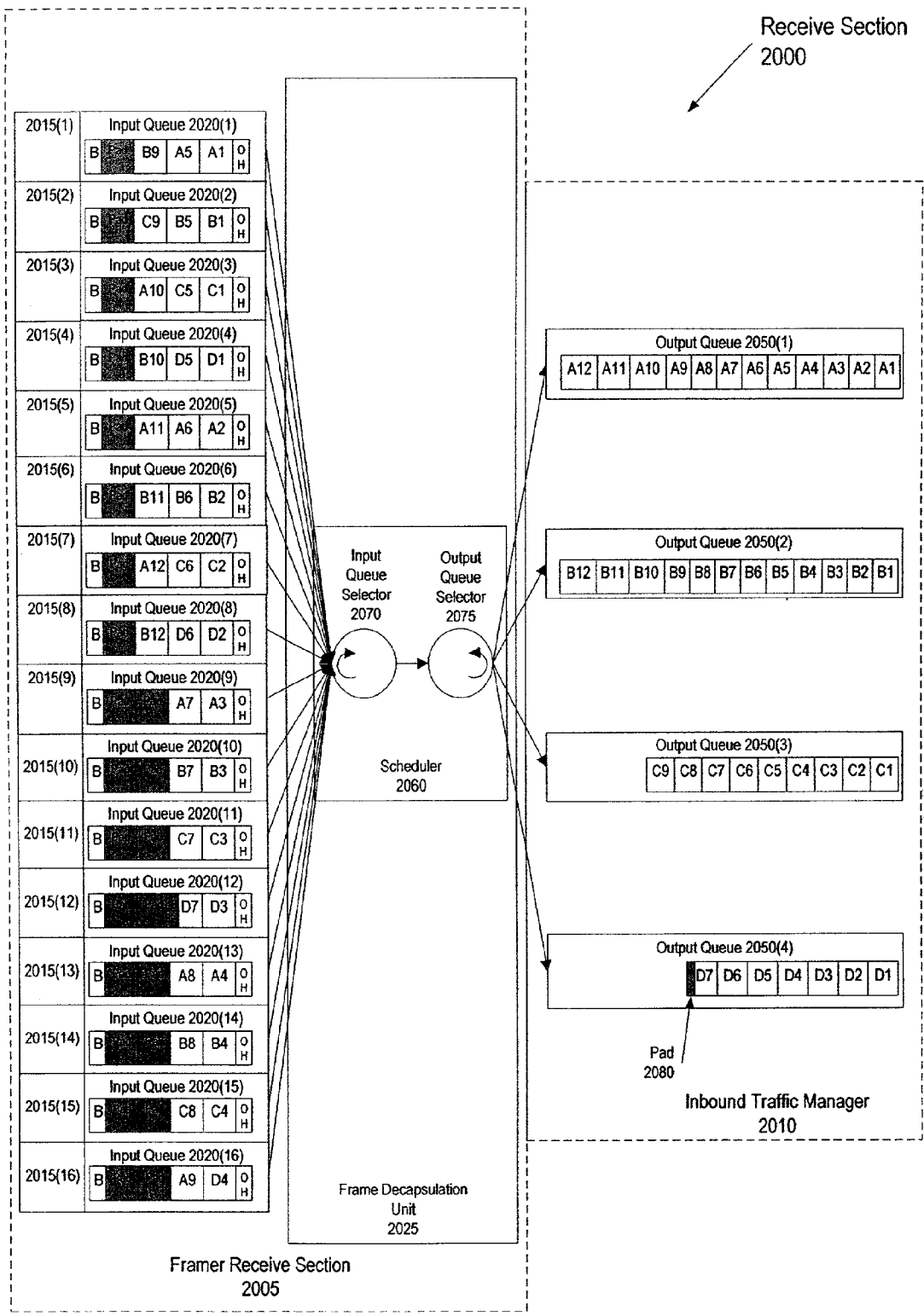
FIG. 20 is a block diagram illustrating portions of a receive section according to embodiments of the present invention.

FIG. 20 is a block diagram illustrating portions of a receive section 2000 such as receive section 362 depicted in FIG. 3. Functionality provided by receive section 2000 includes:

1. the reception and identification of sub-channel frame boundaries
2. the deskewing of sub-channel frames (and, preferably, with the ability to handle sub-channel frames that have an arrival time of within a window at least four PDU times in length);
3. the recovery of PDUs and user data from the group of sub-channels that arrive within the specified window;
4. the generation of sub-channel bitmaps and error condition flags for the received sub-channels; and
5. the ability to add and delete sub-channels from the deskewed group.

Receive section 2000 includes a framer receive section 2005 coupled to an inbound traffic manager 2010. Framer receive section 2005 corresponds to framer receive section 355 in FIG. 3, and includes a number of sub-channel interfaces (depicted in FIG. 20 as sub-channel interfaces 2015(1)–(16)), a number of input queues (depicted in FIG. 20 as input queues 2020(1)–(16)) and a frame decapsulation unit 2025.

In the embodiment shown in FIG. 20, sub-channel interfaces 2015(1)–(16) are capable of performing some or all of the following functions,
1. Sub-channel state monitoring;
2. Frame delineation/synchronization;
3. Overhead CRC (e.g., CRC32) validation;
4. PDU delineation; and
5. Bit-interleaved parity (BIP8) calculation.

Figure 22:
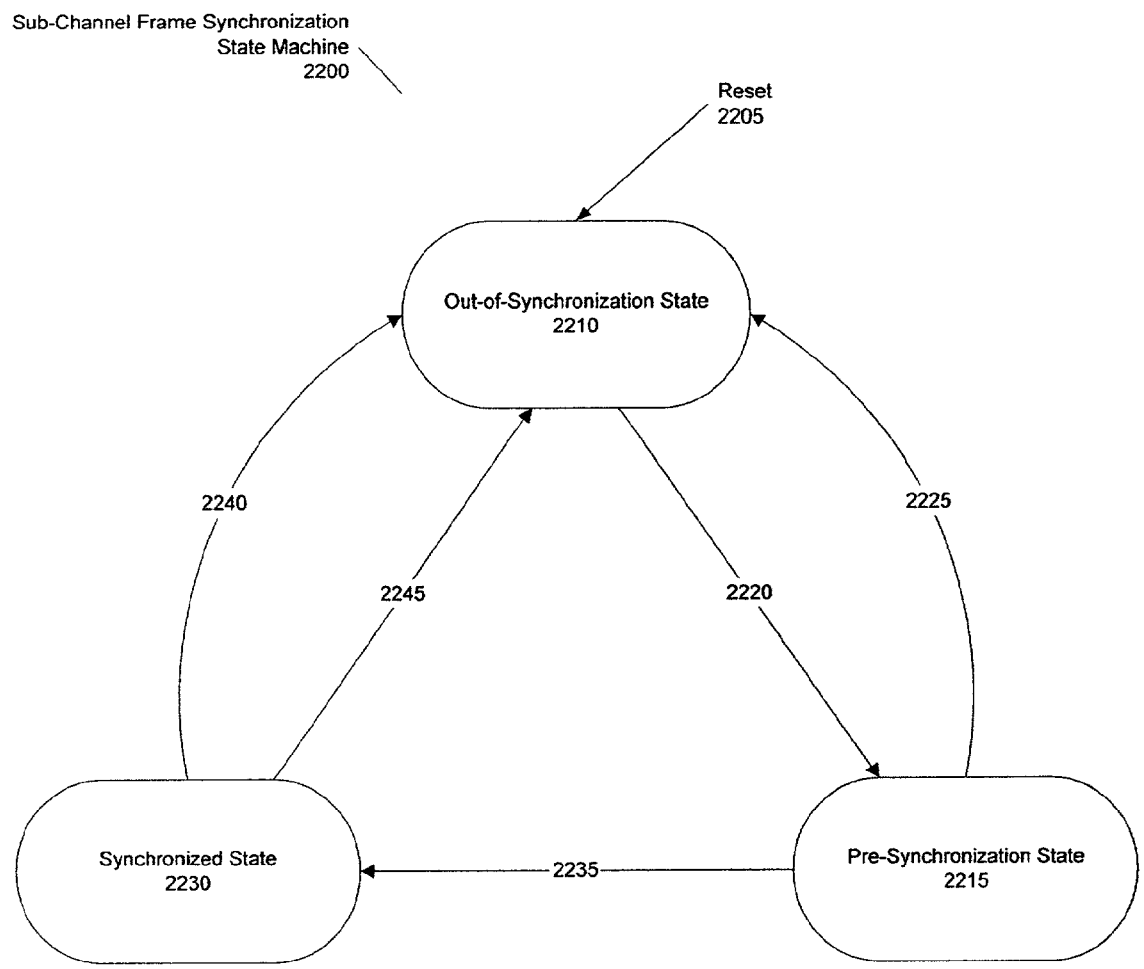
FIG. 22 is a diagram depicting a sub-channel synchronization state machine according to embodiments of the present invention.

Each of sub-channel interfaces 2015(1)–(16) receives a byte stream (which is de-scrambled) from a corresponding line interface card (not shown). The frame delineation mechanism uses SOF information, CRC32 information and frame length to identify each frame's boundaries, which allows the identification of the frame boundary within 3 frame times. After reliable frame delineation is accomplished, the sub-channel frame synchronization state machine, as described with regard to FIG. 22, is used to maintain and monitor sub-channel frame synchronization. Once sub-channel frame synchronization is achieved, frame headers are sent to a super-channel synchronization module (not shown) to achieve synchronization across the sub channels of a given super-channel. The PDUs are delineated (every 513 bytes from frame header is a PDU), and sent to a re-sequencer/demultiplexer (not shown) for further processing. A BIP8 calculation is performed on each frame. Any BIP8 errors are reported to the system processor. A BIP8 error counter is maintained in each one of sub-channel interfaces 2015(1)–(16) to keep track of their datastreams' respective error rate.

Inbound traffic manager 2010 corresponds to inbound traffic manager 360 of FIG. 3, and includes a number of output queues (depicted in FIG. 20 as output queues 2030(1)–(4)). Frame decapsulation unit 2025 couples input queues 2020(1)–(16) of framer receive section 2005 to output queues 2050(1)–(4) of inbound traffic manager 2010. Frame decapsulation unit 2025 provides such coupling via a scheduler 2060. Scheduler 2060 includes an input queue selector 2070 and an output queue selector 2075. Input queue selector 2070 couples a selected one of input queues 2020(1)–(16) to output queue selector 2075. In a similar fashion, output queue selector 2075 couples the output of input queue selector 2070 to a elected one of output queues 2050(1)–(4). It will be noted that the last data block in input queue 2020(12) (designated D7) is a partial data block (similar to PDU 1635 of FIG. 16C) and includes a pad, which appears in output queue 2050(4) as pad 2080.

The frame receive sequence and procedures include the following actions. The framer receive section 2005 demultiplexes PDUs and delivers data contained therein to the appropriate one of output queues 2050(1)–(4), as shown in FIG. 20. The PDUs received are preferably demultiplexed in strict order starting from sub_ch_ID #0 to sub_ch_ID #N. PDU information contained in each PDU is used to further demultiplex the PDUs to their respective output queue. It will be noted that the sub-channels are numbered at the transmitter and the physical connection at the receiver need not be in the same order. The data portion of the PDU (e.g., 512 bytes for a full PDU, or the number of bytes indicated by the data length field, in case of a partial PDU) are transferred to output queues 2050(1)–(4). If a packet-aware mode is used, then an HDLC-like packet delineation algorithm can be used to recover packet boundaries on the given output queue. Receive section 2000 is typically configured in a packet-aware mode only if the transmit framer is also configured in such a mode. Preferably, an independent HDLC-like encapsulation is used on the information provided to each of output queues 2050(1)–(4).

For correct demultiplexing of PDUs, it is necessary to ensure that frames belonging to different sub-channels arrive within an allowable delay tolerance (specified in terms of "PDU times"). All the sub-channels that follow this delay criteria should be included in the super-channel carrying a given user's data. Two independent state machines can be defined to acquire correct frame synchronization. One state machine (the sub-channel synchronization state machine) operates on each sub-channel interface, while the other (the super-channel synchronization state machine) operates across the correctly-operating sub-channels. These two state machines are described in connection with FIGS. 22 and 23.

Figure 21:
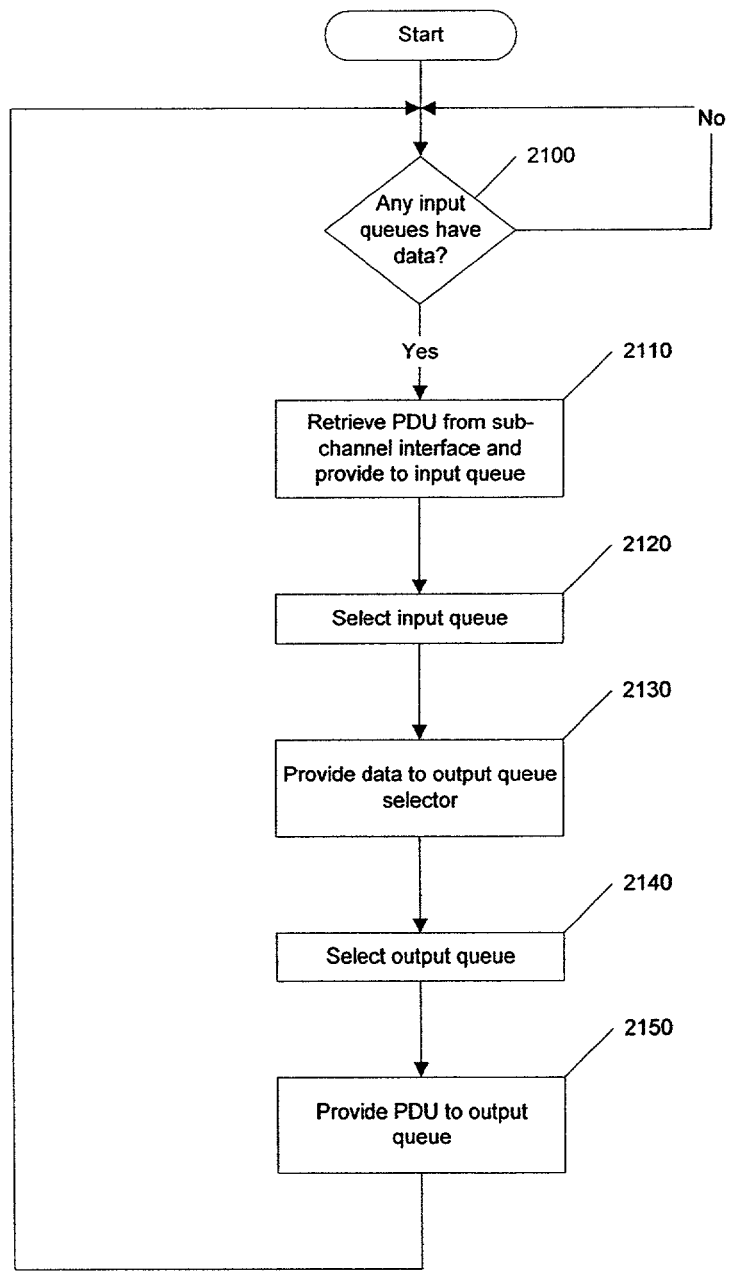
FIG. 21 is a flow diagram illustrating an example of the operation of a receive section according to embodiments of the present invention.

FIG. 21 is a flow diagram illustrating an example of the operation of receive section 2000. These operations begin with a determination as to whether any of input queues 2020(1)–(16) contain any data (step 2100). As long as input queues 2020(1)–(16) contain no data, the process awaits the receipt of such data (step 2100). Upon the receipt of data in one or more of input queues 2020(1)–(16), payload data units are retrieved from the respective sub-channel interface and provided to its corresponding input queue (step 2110). The input queue is selected (step 2120) and the data from the payload data unit is provided to the output queue selector (output queue selector 2075) by the input queue selector (input queue selector 2070) (step 2130). The output queue selector selects the output queue to which the data will be provided (step 2140) and provides the given payload data unit to the selected output queue (step 2150). This process continues until no further data remains to be provided to any of the output queues (step 2100).

An Example of Sub-Channel Synchronization

FIG. 22 is a state machine diagram that illustrates the processes involved in frame synchronization and link monitoring, and behavior of a sub-channel in each state, in a routing unit according to embodiments of the present invention. Example definitions and parameter values of state machine triggers discussed below are defined in Table 5.

TABLE 5

Trigger/Parameter definitions for the sub-channel synchronization state machine depicted in FIG. 22.

| Trigger/Parameter | Definition | Default |
|---|---|---|
| n | 1–3 | 2 |
| m | 1–5 | 3 |
| Invalid SOF | No Frame header received or Frame header does not arrive within expected time interval. | — |
| Errored SOF | Frame header received at the right time with Bad CRC Incorrect frame counter | — |
| Loss Of Signal | No data received for one PDU time | — |

FIG. 22 thus depicts a sub-channel frame synchronization state machine (state machine) 2200 that is initialized by a reset (depicted in FIG. 22 as a reset 2205). Upon being reset, state machine 2200 transitions to an out-of-synchronization state 2210. Out-of-synchronization state 2210 is the power-on state for any sub-channel. The given sub-channel interface should monitor the link in this state. If link is operational, then the given sub-channel interface performs frame delineation operations. It will be noted that PDUs and BIP8 bytes can be ignored in this state.

A valid start of frame is found by searching for the SOF byte pattern (e.g., A1,A2 bytes), verifying the CRC-32 of the frame header following the SOF bytes and then checking for the re-occurrence of start-of-frame (e.g., A1, A2 bytes) one frame time later. At this time, valid frame boundary is considered to have been found. Upon this receipt of a valid start-of-frame, state machine 2200 transitions from out-of-synchronization state 2210 to a pre-synchronization state 2215, via a transition 2220. The sub-channel interface in question remains in pre-synchronization state 2215 for at least n consecutive frames. Each of the frame headers are validated while in pre-synchronization state 2215.

If the given link fails while the sub-channel interface is in pre-synchronization state 2215 (e.g., invalid or errored frame header occurs), the error condition flags are set to indicate an LOS condition, and the given sub-channel interface transitions from pre-synchronization state 2215 back to out-of-synchronization state 2210, via a transition 2225. Otherwise, upon the receipt of one invalid or errored SOF or LOS, the error condition flags are set to LOF (loss-of-frame) to indicate that synchronization on incoming frames is not established, and the affected sub-channel interface transitions out of pre-synchronization state 2215 to out-of-synchronization state 2210, also via transition 2225. It will be noted that PDUs and BIP8 bytes can be ignored in this state.

Upon the receipt of n consecutive valid start-of-frame indications (i.e., n valid frames), the sub-channel interface transitions from pre-synchronization state 2215 to a synchronized state 2230, via a transition 2235. When the sub-channel interface enters synchronized state 2230, the frame synchronization process is complete. The LOF indication is thus removed from the error conditions flags, because the sub-channel is now properly framed.

When a sub-channel interface is in synchronized state 2230, information in the received frames is handled as follows. With regard to the frame header, if the frame header has an invalid SOF or an LOS occurs, the sub-channel interface transitions from synchronized state 2230 to out-of-synchronization state 2210 via a transition 2240, with the error condition flags set to indicate an LOS. If the frame header contains errors, then the frame header should be treated as a good frame header until m errored frame headers are received back-to-back. Upon the receipt of m consecutive errored start-of-frame indications the sub-channel interface transitions from synchronized state 2230 to out-of-synchronization state 2210, via a transition 2245 (with the error condition flags indicating LOF). No information, like sub-channel bitmaps, the error conditions flags and the like, should be used from the errored frame header. If m consecutive errored frame headers are received, the sub-channel interface transitions from synchronized state 2230 to out-of-synchronization state 2210 via transition 2245, with the error conditions flags set to indicate CRC error and LOF.

All received PDUs (data and idle) are sent to the re-sequencer/demultiplexer for further processing. If a BIP error is detected, then the error is reported to the system processor. A BIP error counter is implemented to count BIP errors in synchronized state 2230. It will be noted that the sub-channel interface state machine runs independently of super-channel synchronization. Moreover, the sub-channels that acquire frame synchronization may or may not become part of the super-channel, as explained below.

An Example of Super-Channel Synchronization

Figure 23:
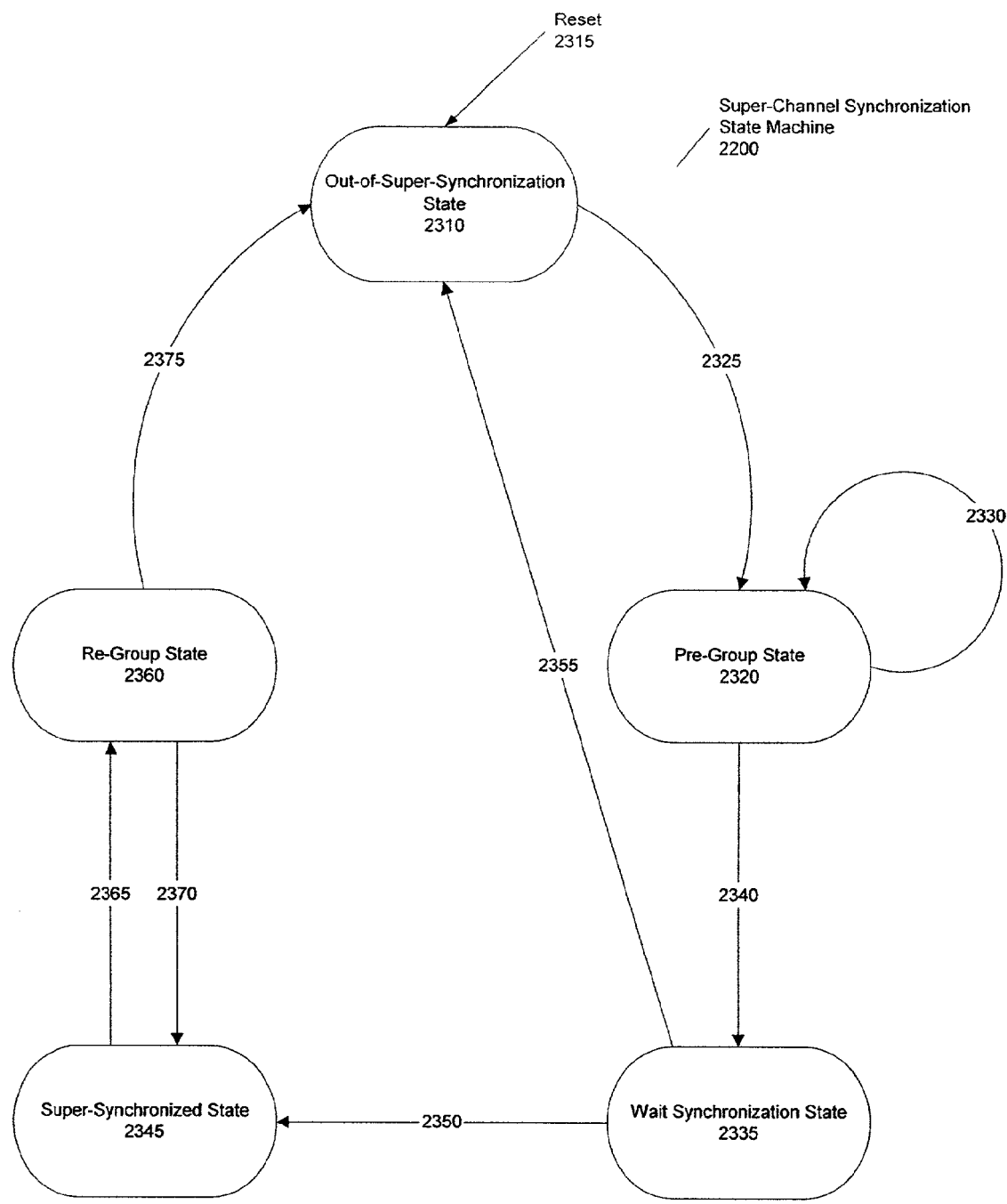
FIG. 23 is a diagram depicting a super-channel synchronization state machine according to embodiments of the present invention.

FIG. 23 is a diagram depicting a super-channel synchronization state machine (state machine) 2300. Super-channel synchronization state machine 2300 executes at a level above that of the sub-channel frame synchronization state machine machines. The primary function of super-channel synchronization state machine 2300 is to identify a group of sub-channels that fall within the skew specifications. The group of sub-channels are preferably selected such that maximum possible number of sub-channels are employed. State machine 2300 also allows sub-channels to be added to/deleted from the group, based on the particular sub-channel's state and configuration changes effected by the management controller. Error condition information and the sub-channel bitmap sent to the far-end packet switch are generated based on various state variables in this state machine. Actions taken in various states are described below. It will be noted that state machine 2300 typically operates only on the frame headers received from the sub-channel interfaces.

Table 6 gives the definition of terms used in describing the operations, states and transitions that define and make up state machine 2300.

TABLE 6

Definition of terms used in describing state machine 2300.

| TERM | DEFINITION |
| --- | --- |
| Valid SOF | Start-of-frame overhead received from sub-channel line interface with a valid super-channel and sub-channel identifier. A SOF containing a duplicate sub-channel identifier is considered invalid. |
| PreGroup_interval | The time required to identify the best sub-channel group meeting the super-channel requirements. This is preferably less than or equal to N frame_time. |
| Super-channel group | A group of sub-channels that follow the following rules: The maximum skew between any two sub-channels in the group is less than skew_limit. All the sub channels carry the same frame counter value. All the sub channels belong to the same super-channel. All the sub-channels have a unique and valid sub-channel identifiers. |
| skew_limit | Allowable transmission skew between various sub-channels, specified as: skew = m * sub-channel_PDU_time The skew limit is a parameter that must be supported by the transmission facility. This parameter directly controls the de-skew buffer requirements for each sub-channel. |
| sub-channel_PDU_time | Time required to receive one PDU on a sub-channel. |
| Unstable super-channel group | All the sub-channels identified to form a super-channel group in PreGroup state are not active on the successive frame. |
| m | 2–4 (default = 2) |
| N | 3 |

State machine 2300 transitions to an out-of-super-channel synchronization state 2310 upon a reset 2315. This is a reset/start-up state for the super-channel. The local sub-channel bitmap is reset to all 0s, indicating that none of the sub-channels are ready to accept the user data yet. The error condition flags should indicate LOS/LOF depending on the state of the configured sub-channels. State machine 2300 remains in out-of-super-channel synchronization state 2310 until a valid SOF is received from at least one sub-channel.

From out-of-super-channel synchronization state 2310, state machine 2300 transitions to a pre-group state 2320 upon the receipt of one valid start-of-frame, via a transition 2325. A group of sub-channels conforming to skew requirements is selected in pre-group state 2320. State machine 2300 remains in pre-group state 2320 for at least one PreGroup_interval time to be able to accommodate all possible sub-channels. A valid sub-channel group is formed at the end of this phase. A group is preferably created such that maximum number of sub-channels are able to become part of the group. If there is more than one sub-channel that exhibits the same sub-channel identifier (e.g., due to some error) any one of such sub-channels can be selected. Also, if the frame counters indicated by different sub-channels are different, then a majority value should be selected and only those sub-channels carrying the selected (majority) frame_counter value are used to form the group. Thus, state machine 2300 remains in pre-group state 2320 as valid start-of-frame indications are collected during a pre-group-interval and forming the best super-channel group with a skew window by as illustrated in FIG. 23 by a transition 2330.

At the end of the pre-group-interval, state machine 2300 transitions to a wait synchronization state 2335, via a transition 2340. State machine 2300 enters wait synchronization state 2335 to deskew the sub-channels before entering a super-channel synchronized state 2345, via a transition 2350. Wait synchronization state 2335 is also used to stabilize the selected group. If any sub-channels in the selected group are dropped in a subsequent cycle or a better group could be formed, the state machine returns to out-of-super-channel synchronization state 2310 and restarts the synchronization process. If the selected group is stable, state machine 2300 enters super-channel synchronized state 2345, preferably such that PDU #1 from each of the sub-channels in the group are available for demultiplexing.

It will be noted that the sub-channels that are "not configured" by the management entity should not be used while forming a group. In other words, those sub-channels should not influence the formation of the group in any way. The sub-channels that are inhibited by the management entity should be used for group calculations. Upon a sub-channel group being or becoming unstable, state machine 2300 transitions from wait synchronization state 2335 to out-of-super-channel synchronization state 2310, via a transition 2355.

As noted, upon the creation of a skew-compensated super-channel group, state machine 2300 transitions from wait synchronization state 2335 to super-channel synchronized state 2345, via transition 2350. Once the state machine enters super-channel synchronized state 2345, demultiplexing of data from PDUs can begin. At this point, a sub-channel bitmap indicating "1" for all the sub-channels selected in the group is sent to the given framer transmit section. This framer transmit section then sends this sub-channel bitmap to the far-end packet switch. In super-channel synchronized state 2345, the configured sub-channels are preferably monitored. The sub-channels in the group are monitored so that the sub-channels can be removed from the group if errors or skew problems develop. The sub-channels that are not part of the group are also monitored, to allow for their inclusion, should they become eligible.

Upon a change occurring in the super-channel group, state machine 2300 transitions from super synchronized state 2345 to a re-group state 2350, via a transition 2360. Alterations in configuration causing the group bitmap to change are preferably treated as a change in the group. Changes to the group due to sub-channel inhibition by a management entity should not cause a state transition. It will be noted that the large transmission delays (e.g., on the order of tens of ms) can result in large amounts of data-loss (e.g., while sub-channel failure is detected and such information reaches the far-end packet switch). Therefore, the detection of failures on the sub-channels in a group should be performed as quickly as possible.

Re-group state 2350 is provided as a way of dealing with changes to the super-channel group. The super-channel group can be changed when any of the following conditions are met:

1. The new group is a superset of the old group; or
2. The new group is a subset of the old group.

The first condition allows for the addition of new sub-channels to the existing group, while the second condition allows for the removal of bad sub-channels from the group. It will be noted that new sub-channels cannot be added in the same frame cycle in which one or more sub-channels from the existing group are removed. Also, any completely disjoint group of sub-channels should not be allowed to take over the group. This is not recommended because a sudden switch to a new disjoint group may cause a large loss of traffic or may induce instability in the super-channel. Whenever a new group is created, skew compensation must be performed for the new group before entering super synchronized state 2345.

Upon the re-grouping and creation of a new skew-compensated super-channel group, state machine 2300 transitions back from re-group state 2350 to super-channel synchronized state 2345, via a transition 2370. Alternatively, upon the super-channel going out of service, state machine 2300 transitions from re-group state 2360 to out-of-synchronization state 2310, via a transition 2375.

The payload data units (PDUs) are recovered/demultiplexed as follows. One PDU (starting from PDU #1) is take from each sub-channel, starting with the lowest sub-channel identifier (1, using the system described previously). The first byte indicates the output queue identifier and also indicates the length of the user data within the PDU. The PDU information can be parity protected, as noted. If there is a parity error in the PDU information, the PDU is discarded. If the PDU information indicates that the PDU is an idle (empty) PDU, then the PDU is discarded. For all other (data-containing) PDUs, the user data (either full or partial PDU, as indicated by the partial PDU bit) is transferred to the designated output queue. It will be noted that the queue identifier is not typically sent to the output queues.

The raw data extracted from the PDUs can be a byte stream or some type of packet-oriented data with arbitrary packet size. If the framer transmit section and framer receive section are programmed to work in packet mode, the packet boundaries should be preserved using HDLC-like framing. This does not preclude other framing mechanisms that can be used between the framer transmit section and framer receive section for packet delineation. The framer receive section should remove the framing protocol overhead (flags, control and stuff bytes, CRC in case of HDLC, and the like) and present the packets on the available output port interfaces. It will be noted that there is no additional bandwidth available for the overhead of this protocol. When the user data is a byte stream, the user data is presented on the output port with no packet boundary indications.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A frame structure comprising:
   super-channel information, wherein
      said super-channel information comprises
         information regarding a super-channel,
         a super-channel identifier wherein said super-channel identifier identifies said super-channel, and
         primary enable information, and
      said super-channel comprises a plurality of sub-channels linking a first and second network element;
   sub-channel information, wherein
      said sub-channel information comprises a sub-channel identifier, and
      said sub-channel identifier identifies a sub-channel; and
   alternate super-channel information, wherein
      said super-channel information comprises
         an alternate super-channel identifier, and
         alternate enable information, and
      said alternate super-channel identifier identifies an alternate super-channel.

2. The frame structure of claim 1, wherein
   primary enable information is configured to indicate if said super-channel is operational, and
   alternate enable information is configured to indicate if said alternate super-channel is operational.

3. The frame structure of claim 1, wherein
   primary enable information comprises primary LSP enable flags, and
   alternate enable information comprises alternate LSP enable flags.

4. The frame structure of claim 3, wherein
   said primary LSP enable flags and said alternate LSP enable flags are configured to indicate which of said super-channel and said alternate super-channel should carry an LSP.

5. The frame structure of claim 4, wherein
   said primary LSP enable flags are configured to indicate if an LSP should be carried by said super-channel, and
   said alternate LSP enable flags are configured to indicate if said LSP should be carried by said alternate super-channel.

6. The frame structure of claim 1, wherein said super-channel information comprises:
   a sub-channel bitmap, wherein each bit in said sub-channel bitmap represents an operational state of a corresponding sub-channel.

7. The frame structure of claim 6, wherein said sub-channel bitmap comprises:
   a bit corresponding to an operational state of said sub-channel.

8. The frame structure of claim 6, wherein said super-channel information further comprises:
   error condition flags, wherein said error condition flags include a forced/manual switch flag.

9. A frame structure comprising:
   super-channel information, wherein
      said super-channel information comprises
         information regarding a super-channel,
         a super-channel identifier wherein said super-channel identifier identifies said super-channel,
         a sub-channel bitmap, wherein each bit in said sub-channel bitmap represents an operational state of a corresponding sub-channel, and
         error condition flags, wherein said error condition flags include a forced/manual switch flag, and
      said super-channel comprises a plurality of sub-channels linking a first and second network element; and
   sub-channel information, wherein
      said sub-channel information comprises a sub-channel identifier, and
      said sub-channel identifier identifies a sub-channel.

10. The frame structure of claim 9, wherein said sub-channel bitmap comprises:
    a bit corresponding to an operational state of said sub-channel.

11. The frame structure of claim 9, wherein said error condition flags further include a bit-error-rate flag, a loss-of-signal flag and a loss-of-frame flag.

12. The frame structure of claim 9, further comprising:
    sub-channel state information, wherein said sub-channel state information conveys a state of said sub-channel.

13. The frame structure of claim 12, wherein said sub-channel state information conveys a state of a connection between a far-end transmitter and a near-end receiver over said sub-channel.

* * * * *